(12) United States Patent
Shibata

(10) Patent No.: US 9,176,698 B2
(45) Date of Patent: Nov. 3, 2015

(54) WIRELESS COMMUNICATION APPARATUS

(71) Applicant: Brother Kogyo Kabushiki Kaisha, Nagoya-shi, Aichi-ken (JP)

(72) Inventor: Hiroshi Shibata, Daifu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/499,470

(22) Filed: Sep. 29, 2014

(65) Prior Publication Data

US 2015/0092231 A1    Apr. 2, 2015

(30) Foreign Application Priority Data

Sep. 30, 2013   (JP) .................................. 2013-205408

(51) Int. Cl.
 *G06F 3/12*       (2006.01)
 *H04W 76/06*    (2009.01)
 *H04W 76/02*    (2009.01)

(52) U.S. Cl.
CPC ............ *G06F 3/1292* (2013.01); *G06F 3/1203* (2013.01); *G06F 3/1236* (2013.01); *H04W 76/028* (2013.01); *H04W 76/064* (2013.01)

(58) Field of Classification Search
CPC ... G06F 3/1203; G06F 3/1204; G06F 3/1226; G06F 3/1228; G06F 3/1272; G06F 3/1287; G06F 3/1293; G06F 3/1292; G06F 3/1236; G06K 15/4095; H04W 76/028; H04W 76/064
USPC .................................................. 358/1.15, 1.1
See application file for complete search history.

(56) References Cited

U.S. PATENT DOCUMENTS

2007/0184863 A1*   8/2007   Takagi et al. ................. 455/507

FOREIGN PATENT DOCUMENTS

| JP | 2001-326658 A |   | 11/2001 |   |
| JP | 2001326658    | * | 11/2001 | .............. H04L 12/28 |

OTHER PUBLICATIONS english translation of JP 2001-326658.*

* cited by examiner

*Primary Examiner* — Iriana Cruz
(74) *Attorney, Agent, or Firm* — Banner & Witcoff, Ltd.

(57) ABSTRACT

There is provided a wireless communication apparatus which, when a connection request is received from a specific apparatus in a state where an upper limit number of connections are established by the wireless communication apparatus, selects a target apparatus to be disconnected from among a plurality of apparatuses which currently establish a wireless connection with the wireless communication apparatus, disconnects a wireless connection with the target apparatus, and establishes a wireless connection with the specific apparatus. When the plurality of apparatuses includes a first type apparatus which is inoperable according to a specific wireless communication system, and a second type apparatus which is operable according to the specific wireless communication system, the wireless communication apparatus selects an apparatus of a type as the target apparatus based on a disconnection priority determined in advance for the plurality of types of apparatuses.

17 Claims, 12 Drawing Sheets

FIG. 10 (CASE D)

WIRELESS COMMUNICATION APPARATUS

CROSS-REFERENCE TO RELATED APPLICATION

This application claims priority from Japanese Patent Application No. 2013-205408, filed on Sep. 30, 2013, the entire subject matter of which is incorporated herein by reference.

TECHNICAL FIELD

This specification discloses a wireless communication apparatus which is operable as a base station of a wireless network.

BACKGROUND

JP-A-2001-326658 discloses a network which includes a plurality of communication apparatuses. A communication apparatus (hereinafter, referred to as "management communication apparatus") which manages the network confirms the number of connected communication apparatuses currently being connected to the network if a connection request is received from a communication apparatus outside the network. In one embodiment, when the number of connected communication apparatuses exceeds a predetermined value, the management communication apparatus determines whether there is a communication apparatus in a non-communication state, and the communication apparatus in the non-communication state is disconnected from the network. As another example method for selecting a communication apparatus which should be disconnected from the network, there are disclosed a method in which a communication apparatus connected to the network for the longest time is selected, a method in which a communication apparatus which does not access the network for the longest time is selected, a method in which a communication apparatus which has the smallest amount of data to be transmitted is selected, a method in which a communication apparatus having lowest communication priority is selected, and the like.

SUMMARY

Various types of apparatus are able to belong to a wireless network. This specification provides a technique in which, in a situation where various types of apparatuses belong to a wireless network in which a wireless communication apparatus operates as a base station, the wireless communication apparatus can establish a wireless connection with a specific apparatus using a new method when a wireless connection request is received from the specific apparatus in a state where the number of connections matches an upper limit number.

According to an illustrative embodiment of the present invention, there is provided a wireless communication apparatus including: a processor; and memory storing instructions that, when executed by the processor, cause the wireless communication apparatus to perform operations. The operations comprise in a state where a number of connections which is a number of wireless connections currently being established by the wireless communication apparatus operating as a base station of a wireless network matches an upper limit number, receiving a first wireless connection request from a first specific apparatus; when the first wireless connection request is received from the first specific apparatus, selecting a first target apparatus to be disconnected, from among N1 apparatuses which currently establish a wireless connection with the wireless communication apparatus (where N1 is an integer equal to or greater than two), wherein when the N1 apparatuses include a plurality of types of apparatuses including a first type apparatus which is inoperable according to a specific wireless communication system, and a second type apparatus which is operable according to the specific wireless communication system, the selecting preferentially selects, based on a disconnection priority determined in advance for the plurality of types of apparatuses, an apparatus of a type having a highest disconnection priority as the first target apparatus; transmitting a first disconnection request to the first target apparatus to disconnect a wireless connection with the first target apparatus; and establishing a wireless connection with the first specific apparatus after the wireless connection with the first target apparatus is disconnected.

According to the above configuration, when the first wireless connection request is received from the first specific apparatus in a state where the number of connections matches the upper limit number, the wireless communication apparatus selects the first target apparatus from among the N1 apparatuses and disconnects the wireless connection with the first target apparatus. As a result, since the number of connections becomes less than the upper limit number, the wireless communication apparatus establishes the wireless connection with the first specific apparatus. In particular, when the N1 apparatuses include a plurality of types of apparatuses including the first type apparatus which is inoperable according to the specific wireless communication system, and a second type apparatus which is operable according to the specific wireless communication system, the wireless communication apparatus preferentially selects an apparatus of a type having highest disconnection priority as the first target apparatus. Therefore, the wireless communication apparatus is able to appropriately select the first target apparatus based on disconnection priority determined in advance from a viewpoint of whether an apparatus is operable according to the specific wireless communication system. That is, the wireless communication apparatus is able to establish the wireless connection with the first specific apparatus using a new appropriate method.

A control method for realizing the above-described wireless communication apparatus, a computer program, and a non-transitory computer-readable recording medium having the computer program recorded thereon are new and useful. A system including the wireless communication apparatus and any apparatus (for example, the first specific apparatus) described above is new and useful.

BRIEF DESCRIPTION OF THE DRAWINGS

The above and other aspects of the present invention will become more apparent and more readily appreciated from the following description of illustrative embodiments of the present invention taken in conjunction with the attached drawings, in which.

Figure 1:
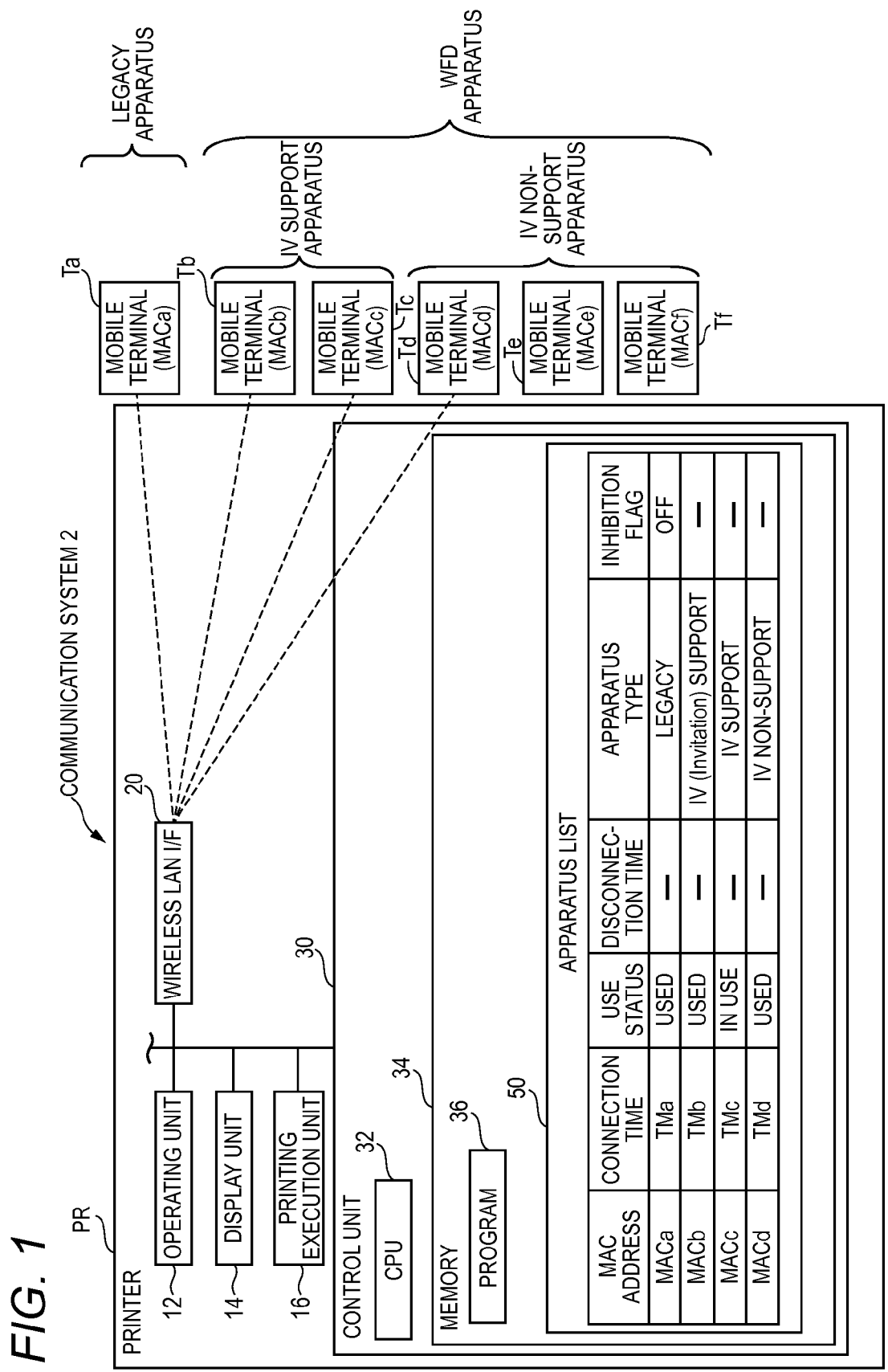
FIG. 1 shows the configuration of a communication system.

DETAILED DESCRIPTION (Configuration of System: FIG. 1)

A communication system 2 according to this illustrative embodiment includes a printer PR and a plurality of mobile terminals Ta to Tf. The printer PR and the mobile terminals Ta and Tf are able to execute Wi-Fi communication as wireless communication according to a Wi-Fi system defined by Wi-Fi Alliance.

(Configuration of Printer PR)

The printer PR is a peripheral apparatus (that is, a peripheral apparatus of a Personal Computer (PC) or the like) which is able to execute a printing function. The printer PR includes an operating unit 12, a display unit 14, a printing execution unit 16, a wireless Local Area Network (LAN) interface 20, and a control unit 30. The respective units 12 to 30 are connected to a bus line (reference numeral is omitted). Hereinafter, the interface is referred to as "I/F".

The operating unit 12 includes a plurality of keys. The user operates the operating unit 12 to input various instructions to the printer PR. The display unit 14 is configured to display various kinds of information. The printing execution unit 16 is an ink jet type or laser type printing mechanism.

The wireless LAN I/F 20 is configured to execute Wi-Fi communication according to the Wi-Fi system. The Wi-Fi system is, for example, a wireless communication system which is provided to execute wireless communication according to the 802.11 standard of IEEE (The Institute of Electrical and Electronics Engineers, Inc.) and an equivalent standard (for example, 802.11a, 11b, 11g, 11n, or the like). Specifically, the wireless LAN I/F 20 supports a Wi-Fi Direct (WFD) system defined by Wi-Fi Alliance. Accordingly, the control unit 30 is able to execute Wi-Fi communication through the wireless LAN I/F 20 using a WFD system wireless network (hereinafter, referred to as "WFDNW").

The control unit 30 includes a CPU 32 and a memory 34. The CPU 32 is a processor which executes various kinds of processing according to a program 36 stored in the memory 34. The memory 34 is able to store an apparatus list 50 as well as the program 36.

The apparatus list 50 is a list in which each relevant information of each mobile terminal (for example, Ta), for which a wireless connection is established by the printer PR, is described. Each relevant information is information in which a MAC address, a connection time, a use status, a disconnection time, an apparatus type, and an inhibition flag are associated with one another. The "MAC address" is a MAC address of a mobile terminal. The "connection time" is a time when the printer PR establishes a wireless connection with a mobile terminal. The "use status" represents a communication situation of print data according to a predetermined application program (hereinafter, referred to as "printing application") installed on a mobile terminal. The printing application is an application program which is provided to supply print data to the printer PR to cause the printer PR to execute the printing function. The "disconnection time" is a time when the printer PR disconnects a wireless connection with a mobile terminal. The "apparatus type" represents a type of a mobile terminal. The "inhibition flag" is a flag which represents whether a wireless connection with a mobile terminal is permitted to be established (that is, "ON") or a wireless connection is not permitted to be established (that is, "OFF") when the printer PR receives a connection request from a mobile terminal.

The type of a mobile terminal is largely divided into a legacy apparatus and a WFD apparatus. The WFD apparatus is classified into an IV (Invitation) support apparatus and an IV non-support apparatus. The legacy apparatus is an apparatus which is inoperable according to the WFD system. The WFD apparatus (that is, an IV support apparatus and an IV non-support apparatus) is an apparatus which is operable according to the WFD system. The IV support apparatus is an apparatus which supports an Invitation Request signal, that is, an apparatus which is able to establish a wireless connection according to an Invitation Request signal. The IV non-support apparatus is an apparatus which does not support an Invitation Request signal, that is, an apparatus which is unable to establish a wireless connection according to an Invitation Request signal. In the "apparatus type" in the apparatus list 50, any of "legacy", "IV support", and "IV non-support" is described. In the apparatus list 50, while the inhibition flag is described in association with the apparatus type "legacy", no inhibition flag is described in association with the apparatus type "IV support" or "IV non-support".

(Configuration of Mobile Terminals Ta to Tf)

Each of the mobile terminals Ta to Tf is a portable terminal device, such as a mobile phone (for example, a smartphone), a PDA, a notebook PC, a tablet PC, a mobile music playing device, or a mobile motion image playing device. Hereinafter, the MAC addresses of the mobile terminals Ta to Tf are respectively referred to as "MACa" to "MACf".

The mobile terminal Ta is a legacy apparatus, and the mobile terminals Tb to Tf are WFD apparatuses. The mobile terminals Tb and Tc are IV support apparatuses, and the mobile terminals Td to Tf are IV non-support apparatus.

(WFD System)

Subsequently, the WFD system will be described. The WFD system is a wireless communication system which is described in the written standard "Wi-Fi Peer-to-Peer (P2P) Technical Specification Version 1.1 (Wi-Fi Alliance, 2010)" prepared by Wi-Fi Alliance.

In the standard of WFD, as a state of a WFD apparatus, three states including a group owner state (hereinafter, referred to as "G/O state"), a client state (hereinafter, referred to as "CL state"), and a device state are defined. A WFD apparatus is selectively operable in one state among the three states.

A WFD apparatus in a G/O state (that is, G/O apparatus) is an apparatus which forms a wireless network (that is, WFDNW), in which the WFD apparatus operates as a base station. A WFD apparatus in a CL state (that is, CL apparatus) is an apparatus which operates as a client station of the WFDNW. A WFD apparatus in a device state (that is, device apparatus) is an apparatus which does not belong to the WFDNW.

A WFDNW to which both of a G/O apparatus and a CL apparatus belong is formed by, for example, any of the following two procedures. In the first procedure, a pair of device apparatuses executes wireless communication which is called G/O negotiation. Here, it is determined that one of the pair of device apparatuses becomes a G/O state (that is, G/O apparatus) and the other device apparatus becomes a CL state (that is, CL apparatus). Then, the G/O apparatus forms a WFDNW and establishes a wireless connection with the CL apparatus. Thus, a WFDNW to which both of a G/O apparatus and a CL apparatus belong is formed. That is, the WFD system is a wireless communication system which has a procedure of G/O negotiation.

In the second procedure, a device apparatus is voluntarily transited to a G/O state to form a WFDNW without executing G/O negotiation. In this case, after the WFDNW is formed, another device apparatus is transited to a CL state to establish a wireless connection with the G/O apparatus without executing G/O negotiation. Accordingly, a WFDNW to which both of a G/O apparatus and a CL apparatus belong is formed.

The G/O apparatus is able to execute wireless communication of target data with the CL apparatus without passing through other apparatuses. Target data is data including information of a network layer or higher layer (for example, an application layer) of an OSI reference model, and includes, for example, print data representing an image to be printed. When a plurality of CL apparatuses participates in a WFDNW formed by a G/O apparatus, the G/O apparatus is able to relay wireless communication of target data between a pair of CL apparatuses. Accordingly, in the WFDNW, each apparatus is able to execute wireless communication of target data without passing through an access point (hereinafter, referred to as "AP") provided separately from each apparatus. That is, the WFD system is a wireless communication system in which an AP is not used.

While the G/O apparatus is unable to execute wireless communication of target data with a device apparatus which does not belong to the WFDNW, the G/O apparatus executes wireless communication of data for connection with a device apparatus, thereby establishing a wireless connection with the device apparatus. Accordingly, the G/O apparatus allows the device apparatus to participate in the WFDNW.

The G/O apparatus executes wireless communication of data for connection with a legacy apparatus which does not belong to the WFDNW, thereby establishing a wireless connection with the legacy apparatus. Accordingly, the G/O apparatus allows the legacy apparatus to participate in the WFDNW.

Data for connection (that is, data not including information of the network layer) includes information of a lower layer (for example, a physical layer, a data link layer, or the like) than the network layer of the OSI reference model. Specifically, data for connection is classified into either of normal connection data which does not include unique data to the WFD system and WFD connection data which includes unique data.

The normal connection data includes, for example, a Probe Request/Response signals, Authentication Request/Response signals, Association Request/Response signals, WSC Exchange, 4-Way Handshake, and the like. The Probe Request signal is a signal for searching for apparatuses (for example, G/O apparatus, AP) which operates as a base station of a wireless network, and the Probe Response signal is a response signal to the Probe Request signal. The Authentication Request signal is a signal for confirming an authentication system, and the Authentication Response signal is a response signal to the Authentication Request signal. The Association Request signal is a signal for requesting a connection, and the Association Response signal is a response signal to the Association Request signal. WSC Exchange is a signal for supplying various kinds of information, such as authentication information. 4-Way Handshake is a signal for executing authentication.

The WFD connection data includes, as unique data to the WFD system in addition to the normal connection data, for example, Invitation Request/Response signals, Provision Discovery Request/Response signals, and the like. The Invitation Request signal is a signal which prompts participation in the WFDNW, and the Invitation Response is a response signal to the Invitation Request signal. The Provision Discovery Request signal is a signal for confirming a Wi-Fi Protected Setup (WPS) system (for example, a push-button system, a PIN code system, or the like), and the Provision Discovery Response signal is a response signal to the Provision Discovery Request signal. Hereinafter, "Request" and "Response" are respectively referred to as "Req." and "Res.".

That is, the legacy apparatus executes wireless communication of normal connection data with the AP to establish a wireless connection with the AP and is able to participate as a so-called station in a wireless network formed by the AP. Similarly, the legacy apparatus executes wireless communication of normal connection data with the G/O apparatus to establish a wireless connection with the G/O apparatus and is able to participate as a station in the WFDNW.

A device apparatus (that is, an apparatus which is operable according to the WFD system) executes wireless communication of any of normal connection data and WFD connection data with a G/O apparatus according to the situation to establish a wireless connection with the G/O apparatus and is able to participate in the WFDNW. When the device apparatus executes wireless communication of only normal connection data, it can be said that the device apparatus participates as a station in the WFDNW. This is because the device apparatus does not execute wireless communication of unique data to the WFD system. When the device apparatus executes wireless communication of WFD connection data, it can be said that the device apparatus participates as a CL apparatus in the WFDNW.

As described above, the device apparatus may participate as a station in the WFDNW or may participate as a CL apparatus in the WFDNW. Hereinafter, a station and CL apparatus are referred to as "client station" without distinguishing them.

In a G/O apparatus, usually, an upper limit number of client stations, which are able to belong to the WFDNW formed by the G/O apparatus, is determined in advance. In other words, in the G/O apparatus, the upper limit number of wireless connections which are able to be established by the G/O apparatus simultaneously is determined in advance based on a memory capacity of the wireless LAN I/F or the like. In this illustrative embodiment, the printer PR operates as a G/O apparatus to form a WFDNW, and the upper limit number of wireless connections which are able to be established by the printer PR as the G/O apparatus is "4". However, in a modified illustrative embodiment, the upper limit number may not be "4", and any value may be used insofar as the value is an integer equal to or greater than "2".

Figure 2:
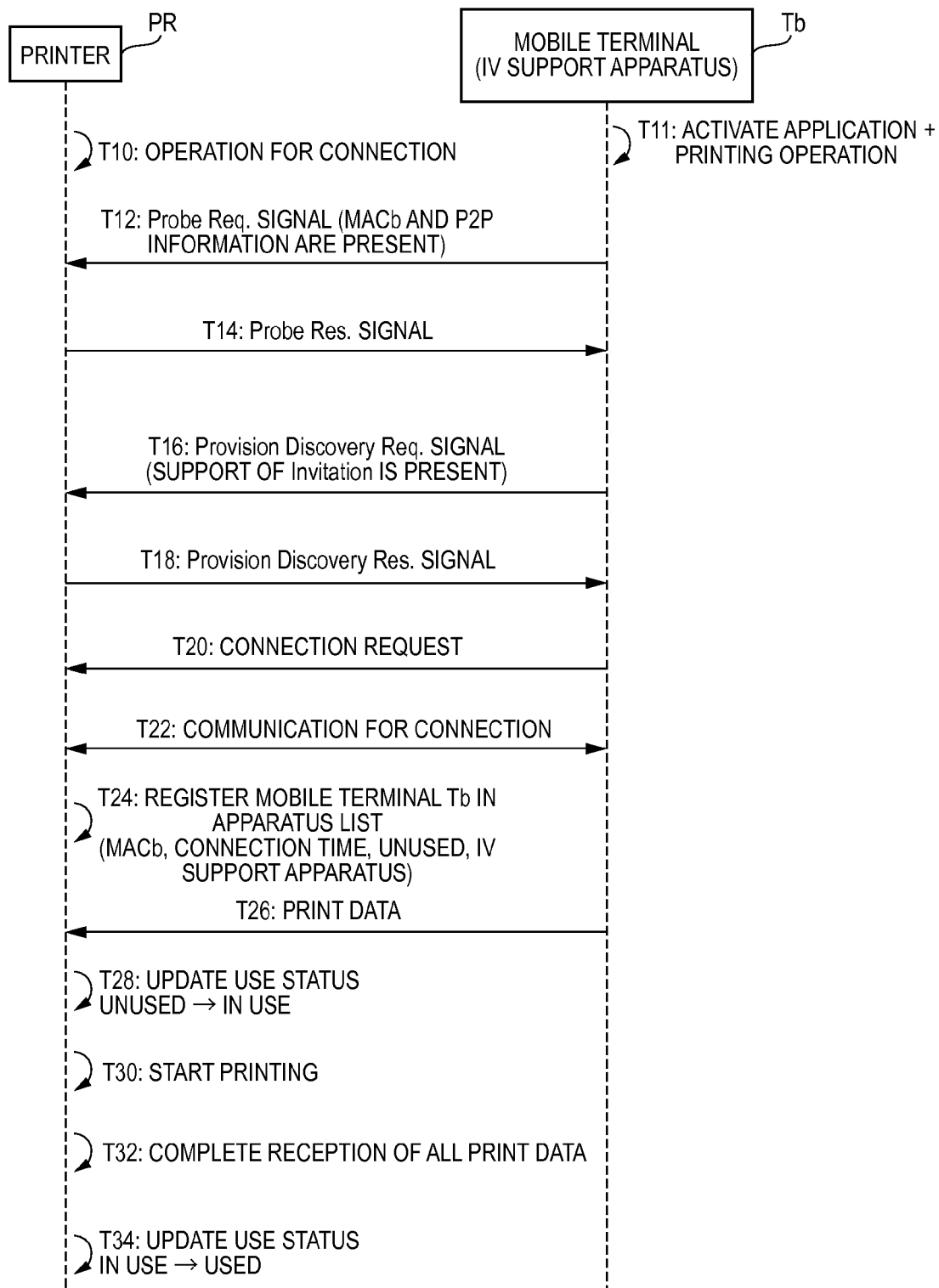
FIG. 2 is a sequence diagram showing a case where a printer establishes a wireless connection with an IV support apparatus.

(Processing in which Printer PR Establishes Wireless Connection with IV Support Apparatus: FIG. 2)

Subsequently, processing in which the printer PR establishes wireless connection with the mobile terminal Tb, which is an IV support apparatus, will be described referring to FIG. 2. In this illustrative embodiment, the CPU 32 of the printer PR causes the state of the printer PR to be transited from a device state to a G/O state to form a WFDNW with power-on of the printer PR as a trigger without executing G/O negotiation. In this stage, no client station belongs to the WFDNW. That is, the WFDNW to which the printer PR as the G/O apparatus belongs is formed.

In T10, the user of the mobile terminal Tb executes a predetermined operation on the operating unit 12 of the printer PR. The predetermined operation is an operation which causes the printer PR to establish a wireless connection, and is, for example, an operation according to a WPS (that is, automatic wireless setup) push-button system.

In T11, the user of the mobile terminal Tb executes an activation operation to activate the printing application and a printing operation to designate print data representing an image to be printed by the printer PR on the mobile terminal Tb.

In T12, the mobile terminal Tb transmits a Probe Req. signal to the printer PR. The Probe Req. signal includes MACb which is the MAC address of the mobile terminal Tb, and peer to peer (P2P) information representing that the mobile terminal Tb is a WFD apparatus.

In T14, if the Probe Req. signal is received from the mobile terminal Tb, the CPU 32 of the printer PR transmits a Probe Res. signal to the mobile terminal Tb.

In T16, when the Probe Res. signal is received from the printer PR, the mobile terminal Tb transmits a Provision Discovery Req. signal to the mobile terminal Tb. The Provision Discovery Req. signal includes support information representing the mobile terminal Tb, which supports the Invitation Req. signal. When the mobile terminal Tb is an IV non-support apparatus, the Provision Discovery Req. signal does not include the support information.

In T18, when the Provision Discovery Req. signal is received from the mobile terminal Tb, the CPU 32 of the printer PR transmits a Provision Discovery Res. signal to the mobile terminal Tb.

In T20, when the Provision Discovery Res. signal is received from the printer PR, the mobile terminal Tb transmits a connection request (that is, an Association Request signal) to the printer PR after communication of an Authentication Request signal and an Authentication Response signal ends.

In T22, when the connection request is received from the mobile terminal Tb, the CPU 32 of the printer PR executes communication of various signals (for example, an Association Response signal, WSC Exchange, and 4-Way Handshake) for establishing a wireless connection with the mobile terminal Tb. Accordingly, the CPU 32 establishes a wireless connection with the mobile terminal Tb to allow the mobile terminal Tb to participate as a client station (specifically, a CL apparatus) in the WFDNW, in which the printer PR operates as the G/O apparatus.

In T24, the CPU 32 of the printer PR registers relevant information of the mobile terminal Tb in the apparatus list 50 (see FIG. 1). Specifically, the CPU 32 describes "MACb", "current time", and "unused" included in the Probe Req. signal of T12 as "MAC address", "connection time", and "use status". The CPU 32 describes "IV support" as "apparatus type" based on the support information included in the Provision Discovery Req. signal of T16. When the mobile terminal Tb is an IV non-support apparatus, the Provision Discovery Req. signal does not include the support information, and thus the CPU 32 describes "IV non-support" as "apparatus type". In T24, the CPU 32 does not describe "disconnection time". Since the mobile terminal Tb is not a legacy apparatus, the CPU 32 does not describe "inhibition flag".

In T26, the mobile terminal Tb transmits print data designated by the printing operation of T11 to the printer PR using the WFDNW. Print data includes MACb of the mobile terminal Tb.

In T28, when print data including MACb is received from the mobile terminal Tb, the CPU 32 of the printer PR changes the "use status" associated with MACb in the apparatus list 50, that is, "use status" included in the related information of the mobile terminal Tb from "unused" to "in use". Then, in T30, the CPU 32 causes the printing execution unit 16 to start printing of an image represented by received print data.

In T32, the CPU 32 detects that the reception of all print data from the mobile terminal Tb is completed. In this case, in T34, the CPU 32 of the printer PR changes "use status" associated with MACb in the apparatus list 50, that is, "use status" included in the relevant information of the mobile terminal Tb from "in use" to "used".

Figure 3:
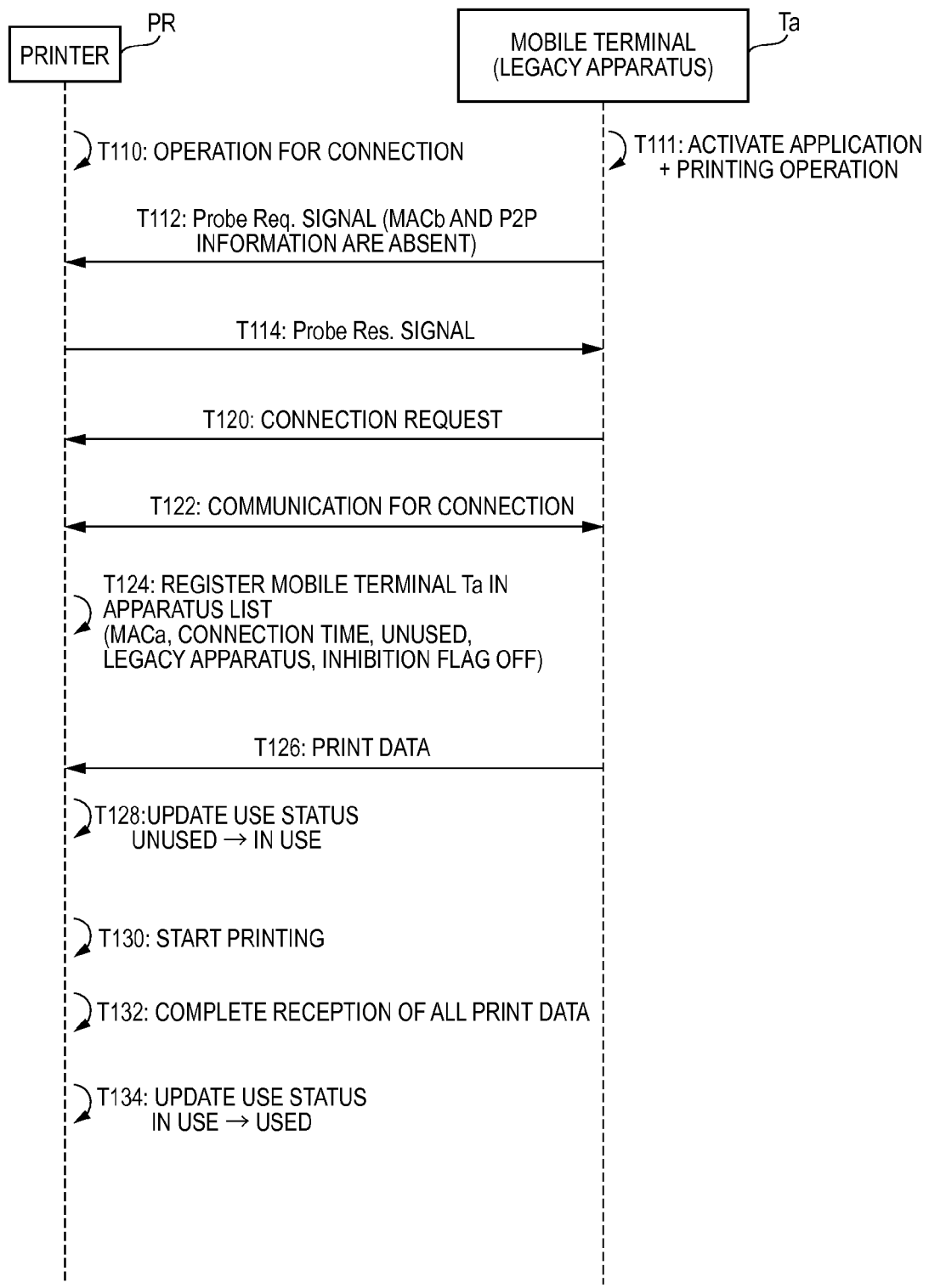
FIG. 3 is a sequence diagram showing a case where a printer establishes a wireless connection with a legacy apparatus.

(Processing in which Printer Establishes Wireless Connection with a Legacy Apparatus: FIG. 3)

Subsequently, processing in which the printer PR establishes a wireless connection with the mobile terminal Ta, which is a legacy apparatus, will be described referring to FIG. 3. T110 and T111 are similar to T10 and T11 of FIG. 2.

In T112, the mobile terminal Ta transmits a Probe Req. signal to the printer PR. The Probe Req. signal includes MACa which is the MAC address of the mobile terminal Ta, but does not include P2P information since the mobile terminal Ta is a legacy apparatus. T114 and T120 are similar to T14 and T20 of FIG. 2. The mobile terminal Ta is a legacy apparatus, and thus, unlike the case of FIG. 2, communication of a Provision Discovery Req. signal and a Provision Discovery Res. signal, which are unique data to the WFD system, is not performed. T122 is similar to T22 of FIG. 2. Accordingly, the CPU 32 establishes a wireless connection with the mobile terminal Ta to allow the mobile terminal Ta to participate as a client station (specifically, a station) in the WFDNW, in which the printer PR operates as the G/O apparatus.

In T124, the CPU 32 of the printer PR registers relevant information of the mobile terminal Ta in the apparatus list 50 (see FIG. 1). Specifically, the CPU 32 describes "MACa", "current time", and "unused" included in Probe Req. signal of T112 as "MAC address", "connection time", and "use status". The CPU 32 describes "legacy apparatus" as "apparatus type" based on P2P information not included in the Probe Req. signal of T112. The CPU 32 describes "OFF" as "inhibition flag". In T124, the CPU 32 does not describe "disconnection time". T126 to T134 are similar to T26 to T34 of FIG. 2.

Figure 4:
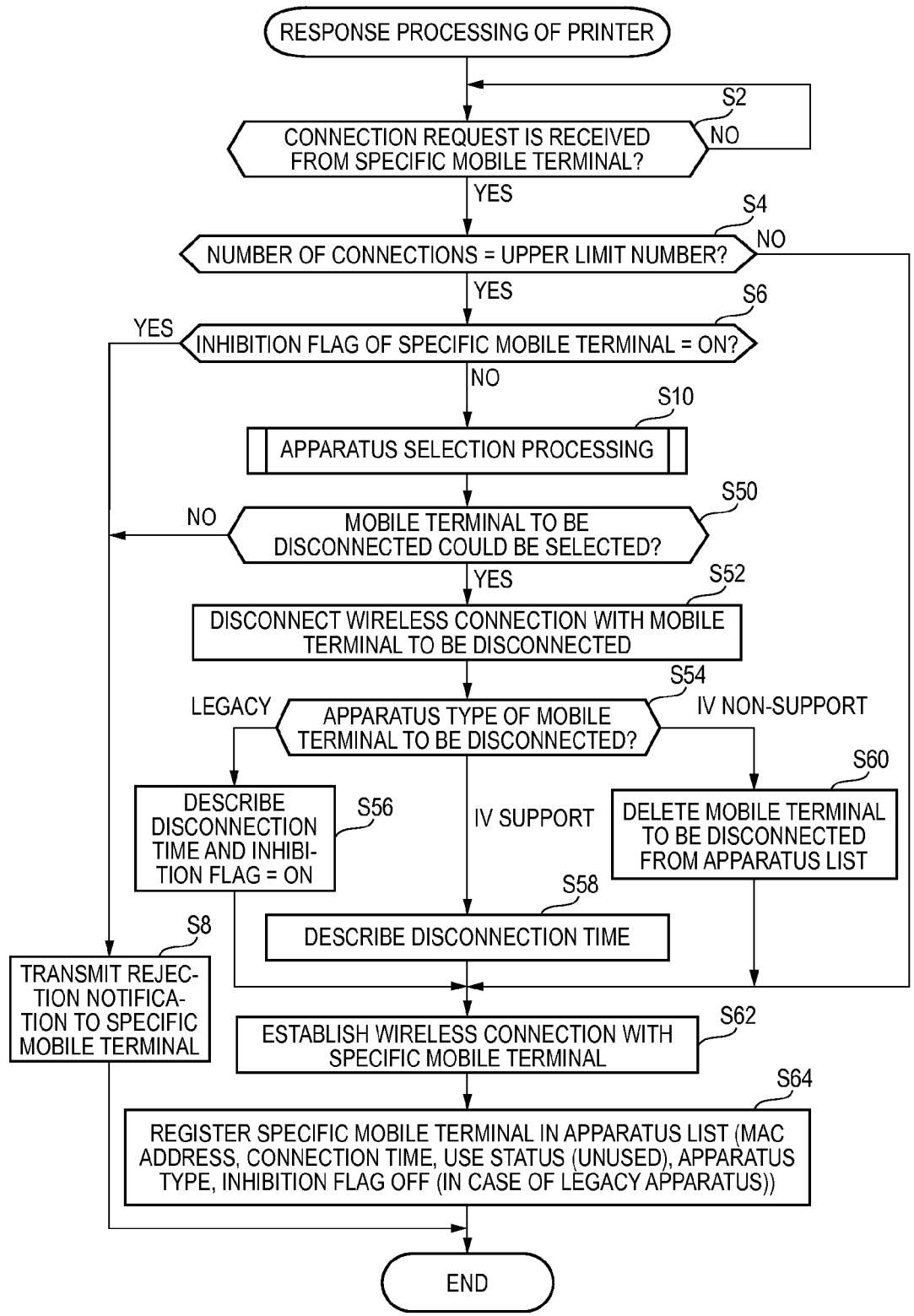
FIG. 4 is a flowchart of response processing of a printer.

(Response Processing of Printer: FIG. 4)

Subsequently, response processing which is executed by the CPU 32 of the printer PR will be described referring to FIG. 4. In S2, the CPU 32 monitors reception of a connection request (that is, Association Request signal, see T20 of FIG. 2, T120 of FIG. 3) from a specific mobile terminal (for example, the mobile terminals Ta to Tf). When the connection request is received from the specific mobile terminal, the CPU 32 determines to be YES in S2, and proceeds to S4.

In S4, the CPU 32 determines whether the number of wireless connections (hereinafter, referred to as "the number of connections") currently established by the printer PR matches the upper limit number "4". Specifically, the CPU 32 first extracts the number of relevant information with the disconnection time not described from the apparatus list 50. The number of relevant information extracted matches the number of connections of the printer PR. Then, when the number of relevant information extracted is less than "4", the CPU 32 determines that the number of connections does not match the upper limit number (NO in S4), skips S6 to S60, and proceeds to S62. When the number of relevant information extracted is "4", the CPU 32 determines that the number of connections matches the upper limit number (YES in S4) and proceeds to S6.

In S6, the CPU 32 determines whether the "inhibition flag" included in the relevant information of the specific mobile terminal is "ON" referring to the apparatus list 50. The connection request received from the specific mobile terminal in S2 includes the MAC address of the specific mobile terminal. When "ON" is described as "inhibition flag" in association with the MAC address included in the connection request, the CPU 32 determines to be YES in S6 and proceeds to S8.

In S8, the CPU 32 determines that a wireless connection with the specific mobile terminal is unable to be established, and transmits a rejection notification to the specific mobile terminal. That is, the CPU 32 does not establish the wireless connection with the specific mobile terminal in response to the connection request received in S2. If S8 ends, the response processing ends.

In S6, when "inhibition flag" which is associated with the MAC address included in the connection request is not "ON", the CPU 32 determines to be NO in S6 and proceeds to S10. When the MAC address included in the connection request is not present in the apparatus list 50, when "inhibition flag" which is associated with the MAC address included in the connection request is "OFF", or when "inhibition flag" itself is not described in association with the MAC address included in the connection request, the CPU 32 determines to be NO in S6.

In S10, the CPU 32 executes apparatus selection processing referring to the apparatus list 50. That is, the CPU 32 attempts to select a mobile terminal to be disconnected, for which a wireless connection should be disconnected, from among mobile terminals, for which a wireless connection with the printer PR is established.

In S50, the CPU 32 determines whether a mobile terminal to be disconnected could be selected in the apparatus selection processing of S10. When a mobile terminal to be disconnected could not be selected, the CPU 32 determines to be NO in S50 and proceeds to S8. When a mobile terminal to be disconnected could be selected, that is, when relevant information of a mobile terminal to be disconnected could be selected from the apparatus list 50, the CPU 32 determines to be YES in S50 and proceeds to S52. Hereinafter, the relevant information selected in S10 is referred to as "selected relevant information".

In S52, the CPU 32 disconnects a wireless connection with the mobile terminal to be disconnected. Specifically, the CPU 32 transmits a disconnection request including the MAC address included in the selected relevant information to the mobile terminal to be disconnected and receives a response signal from the mobile terminal to be disconnected. Accordingly, a wireless connection between the printer PR and the mobile terminal to be disconnected is disconnected, and the number of connections of the printer PR becomes less than the upper limit number "4".

In S54, the CPU 32 determines the apparatus type of the mobile terminal to be disconnected (that is, the mobile terminal for which the wireless connection is disconnected in S52) referring to the selected relevant information. When the apparatus type is "legacy", the process proceeds to S56, when the apparatus type is "IV support", the process proceeds to S58, and when the apparatus type is "IV non-support", the process proceeds to S60.

In S56, S58, and S60, the CPU 32 updates the apparatus list 50. Specifically, in S56, the CPU 32 describes the current time as "disconnection time" included in the selected relevant information and changes "inhibition flag" included in the selected relevant information from "OFF" to "ON". In S58, the CPU 32 describes the current time as "disconnection time" included in the selected relevant information. In S60, the CPU 32 deletes the selected relevant information from the apparatus list 50. If S56, S58, or S60 ends, the process proceeds to S62.

In S62, the CPU 32 executes communication (see T22 of FIG. 2, T122 of FIG. 3) for establishing a wireless connection with a specific mobile terminal. Accordingly, the CPU 32 establishes a wireless connection with the specific mobile terminal to allow the specific mobile terminal to participate as a client station in the WFDNW, in which the printer PR operates as the G/O apparatus.

Next, in S64, the CPU 32 registers relevant information of the specific mobile terminal in the apparatus list 50. This processing is as described in T24 of FIG. 2 and T124 of FIG. 3.

Figure 5:
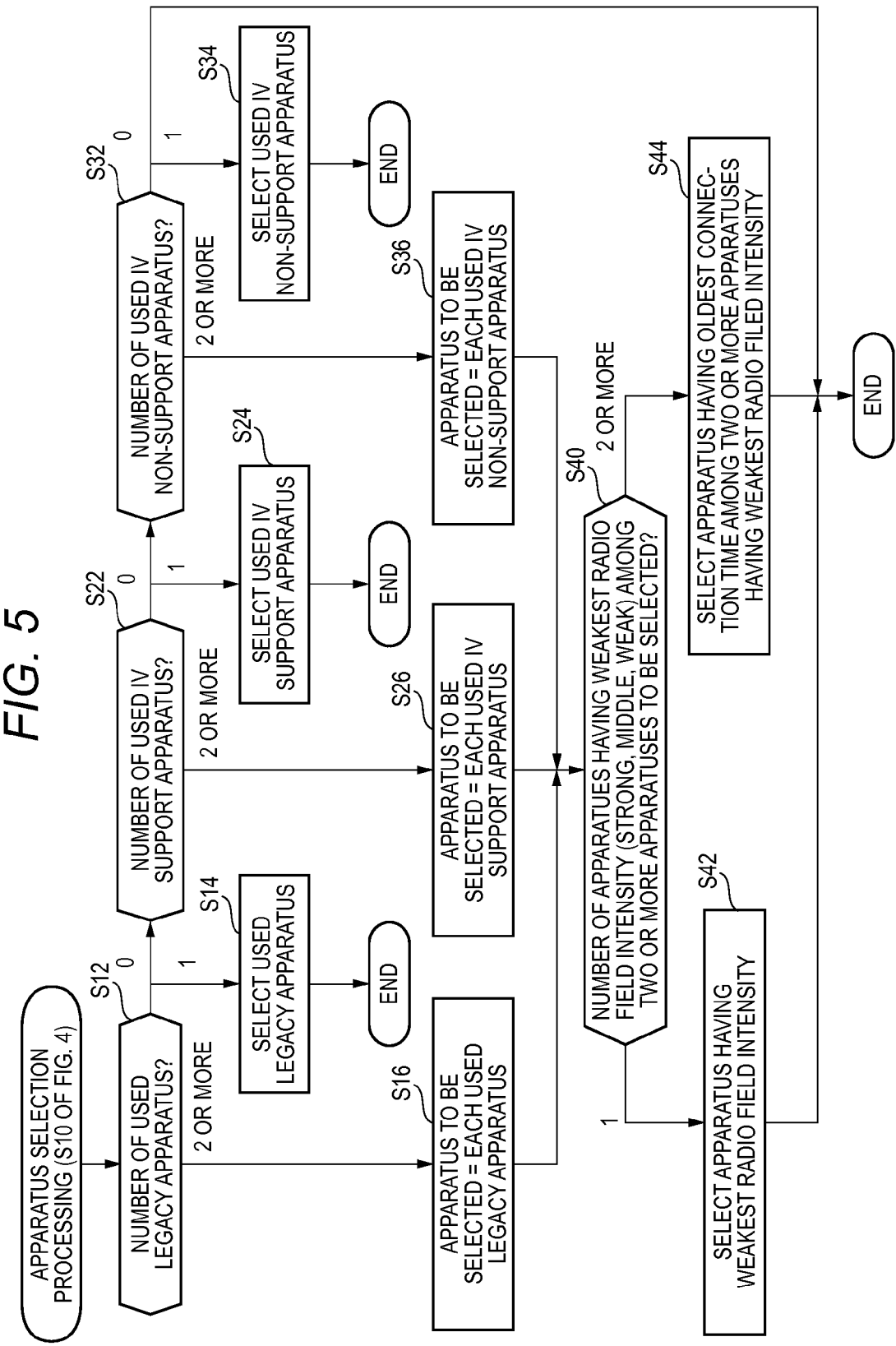
FIG. 5 is a flowchart of apparatus selection processing of a printer.

(Apparatus Selection Processing: FIG. 5)

The details of the apparatus selection processing of S10 of FIG. 4 will be described referring to FIG. 5. Hereinafter, the CPU 32 executes each kind of processing referring to the apparatus list 50.

In S12, the CPU 32 determines the number of used legacy apparatuses among respective apparatuses for which a wireless connection with the printer PR is established. Specifically, the CPU 32 extracts relevant information, in which the disconnection time is not described, the use status "used" is described, and the apparatus type "legacy" is described, referring to the apparatus list 50. When it is determined that the number of relevant information extracted (that is, the number of used legacy apparatuses) is "0", the CPU 32 proceeds to S22.

In S12, when it is determined that only one relevant information is extracted, in S14, the CPU 32 selects the one relevant information to select one used legacy apparatuses as a mobile terminal to be disconnected.

In S12, when it is determined that two or more relevant information are extracted, in S16, the CPU 32 determines each of used legacy apparatuses as an apparatus to be selected which is an option for selecting a mobile terminal to be disconnected. Specifically, the CPU 32 determines the two or more relevant information as relevant information to be used in S40 to S44. If S16 ends, the process proceeds to S40.

In S22, the CPU 32 determines the number of used IV support apparatuses among respective apparatuses, for which a wireless connection with the printer PR is established. Specifically, the CPU 32 extracts relevant information, in which the disconnection time is not described, the use status "used" is described, and the apparatus type "IV support" is described, referring to the apparatus list 50. When it is determined that the number of relevant information extracted (that is, the number of used IV support apparatuses) is "0", the CPU 32 proceeds to S32.

In S22, when it is determined that only one relevant information is extracted, in S24, the CPU 32 selects the one relevant information to select one used IV support apparatuses as a mobile terminal to be disconnected.

In S22, when it is determined that two or more relevant information are extracted, in S26, the CPU 32 determines each of used IV support apparatuses as an apparatus to be selected which is an option for selecting a mobile terminal to be disconnected. If S26 ends, the process proceeds to S40.

In S32, the CPU 32 determines the number of used IV non-support apparatus among respective apparatuses, for which a wireless connection with the printer PR is established. Specifically, the CPU 32 extracts relevant information, in which the use status "used" is described and the apparatus type "IV non-support" is described, from the apparatus list 50. When it is determined that the number of relevant information extracted (that is, the number of used IV non-support apparatus) is "0", the CPU 32 ends the processing of FIG. 5 without selecting a mobile terminal to be disconnected. In this case, it is determined to be NO in S50 of FIG. 4.

In S32, when it is determined that only one relevant information is extracted, in S34, the CPU 32 selects the one relevant information to select one used IV non-support apparatus as a mobile terminal to be disconnected.

In S32, when it is determined that two or more relevant information are extracted, in S36, the CPU 32 determines each of used IV non-support apparatuses as an apparatus to be selected which is an option for selecting a mobile terminal to be disconnected. If S36 ends, the process proceeds to S40.

In S40 to S44, the CPU 32 selects one apparatus out of two or more apparatuses to be selected (that is, two or more used legacy apparatuses, two or more used IV support apparatuses, or two or more used IV non-support apparatuses). Specifically, the CPU 32 selects one apparatus referring to the radio field intensity (and if necessary, the connection time) of each of the two or more apparatuses.

In S40, the CPU 32 determines the number of apparatuses having weakest radio field intensity out of the two or more apparatuses to be selected. For example, the CPU 32 transmits a predetermined signal to each of two or more MAC addresses included in two or more extracted relevant information with the MAC address as a transmission destination, and receives a response signal. Then, the CPU 32 can measure the radio field intensity of each of the two or more apparatuses to be selected. The radio field intensity is expressed in three stages of "strong", "middle", and "weak". The CPU 32 determines whether the number of apparatuses having weakest radio field intensity is "1" or equal to or greater than "2" referring to the radio field intensity of each of the two or more apparatuses to be selected.

In S40, when it is determined that the number of apparatuses having weakest radio field intensity is "1", the CPU 32 proceeds to S42. For example, if a first apparatus, a second apparatus, and a third apparatus are respectively "strong", "middle", and "weak", the number of apparatus having weakest radio field intensity is "1", and thus the process proceeds to S42.

In S42, the CPU 32 selects relevant information of apparatus having weakest radio field intensity. That is, the CPU 32 selects one apparatus having weakest radio field intensity as a mobile terminal to be disconnected. If S42 ends, the processing of FIG. 5 ends.

In S40, when it is determined that the number of apparatuses having weakest radio field intensity is equal to or greater than "2", the CPU 32 proceeds to S44. For example, if a first apparatus, a second apparatus, and a third apparatus are respectively "strong", "middle", and "middle", the number of apparatuses having weakest radio field intensity is "2", and thus the process proceeds to S44.

In S44, the CPU 32 selects relevant information of one apparatus, in which the oldest time is described as "connection time", out of two or more relevant information of two or more apparatuses having weakest radio field intensity. That is, the CPU 32 selects one apparatus having the oldest connection time as a mobile terminal to be disconnected. If S44 ends, the processing of FIG. 5 ends.

(Reason for Use of Selection Method of FIG. 5)

As described above, in the processing of FIG. 5, while an apparatus having the use status "used" can be selected as a mobile terminal to be disconnected, an apparatus having the use status "unused" or "in use" is not selected (that is, when "0" in S12, "0" in S22, and "0" in S32, a mobile terminal to be disconnected is not selected). In used apparatus, communication of all print data ends, and thus there is a low possibility that communication is executed with the printer PR. For this reason, even if a wireless connection with used apparatus is disconnected, there is a low possibility that the user of the apparatus feels inconvenience. In an unused apparatus, while a wireless connection with the printer PR is established, communication of print data is not yet started, and thus there is a high possibility that the user of the apparatus desires to cause the printer PR to execute the printing function. In in-use apparatus, communication of print data is executed between the apparatus and the printer PR. Therefore, if a wireless connection with an unused or an in-use apparatus is disconnected, there is a high possibility that the user of the apparatus feels inconvenience, and thus a method of preventing disconnection of a wireless connection with those apparatuses is used.

A legacy apparatus is preferentially selected as a mobile terminal to be disconnected over an IV support apparatus and an IV non-support apparatus (that is, a WFD apparatus) (i.e., the processing of S12 is executed earlier than the processing of S22 and S32). Even if an instruction (for example, the operation of T111 of FIG. 3) is not given from the user after a wireless connection with the printer PR is disconnected due to reception of a disconnection request from the printer PR, a legacy apparatus is able to automatically transmit a connection request to the printer PR. If an instruction (for example, the operation of T11 of FIG. 2) is not given from the user or the Invitation Req. signal is not received from the printer PR after a wireless connection with the printer PR is disconnected due to reception of the disconnection request from the printer PR, a WFD apparatus is unable to transmit a connection request to the printer PR. That is, a legacy apparatus automatically transmits a connection request to the printer PR, whereby it is possible to comparatively easily re-establish a wireless connection with the printer PR compared to a WFD apparatus. Therefore, a method of preferentially selecting a legacy apparatus as a mobile terminal to be disconnected is used.

An IV support apparatus is preferentially selected as a mobile terminal to be disconnected over an IV non-support apparatus (that is, the processing of S22 is executed earlier than the processing of S32). An IV support apparatus is able to re-establish a wireless connection with the printer PR according to the Invitation Req. signal. An IV non-support apparatus is unable to re-establish a wireless connection with the printer PR in response to the Invitation Req. signal. That is, an IV support apparatus is able to comparatively easily re-establish a wireless connection with the printer PR compared to an IV non-support apparatus. Therefore, a method of selecting preferentially an IV support apparatus as a mobile terminal to be disconnected is used.

An apparatus having weakest radio field intensity is preferentially selected as a mobile terminal to be disconnected (see S40). There is a high possibility that an apparatus having weakest radio field intensity is present at a location away from the printer PR. Accordingly, there is a low possibility that the user of the apparatus desires to cause the printer PR to execute the printing function. Therefore, even if a wireless connection with the apparatus is disconnected, there is a low possibility that the user of the apparatus feels inconvenience. Therefore, a method of preferentially selecting an apparatus having weakest radio field intensity as a mobile terminal to be disconnected is used.

An apparatus having the oldest connection time is preferentially selected as a mobile terminal to be disconnected (see S44). There is a high possibility that, for example, when the user of an apparatus having a new connection time is not satisfied with the printing result of the printer PR, the user causes the printer PR to execute the printing function again. Accordingly, if a wireless connection with an apparatus having newer connection time is disconnected, there is a high possibility that the user of the apparatus feels inconvenience. Therefore, a method of preferentially selecting an apparatus having the oldest connection time as a mobile terminal to be disconnected is used.

Figure 6:
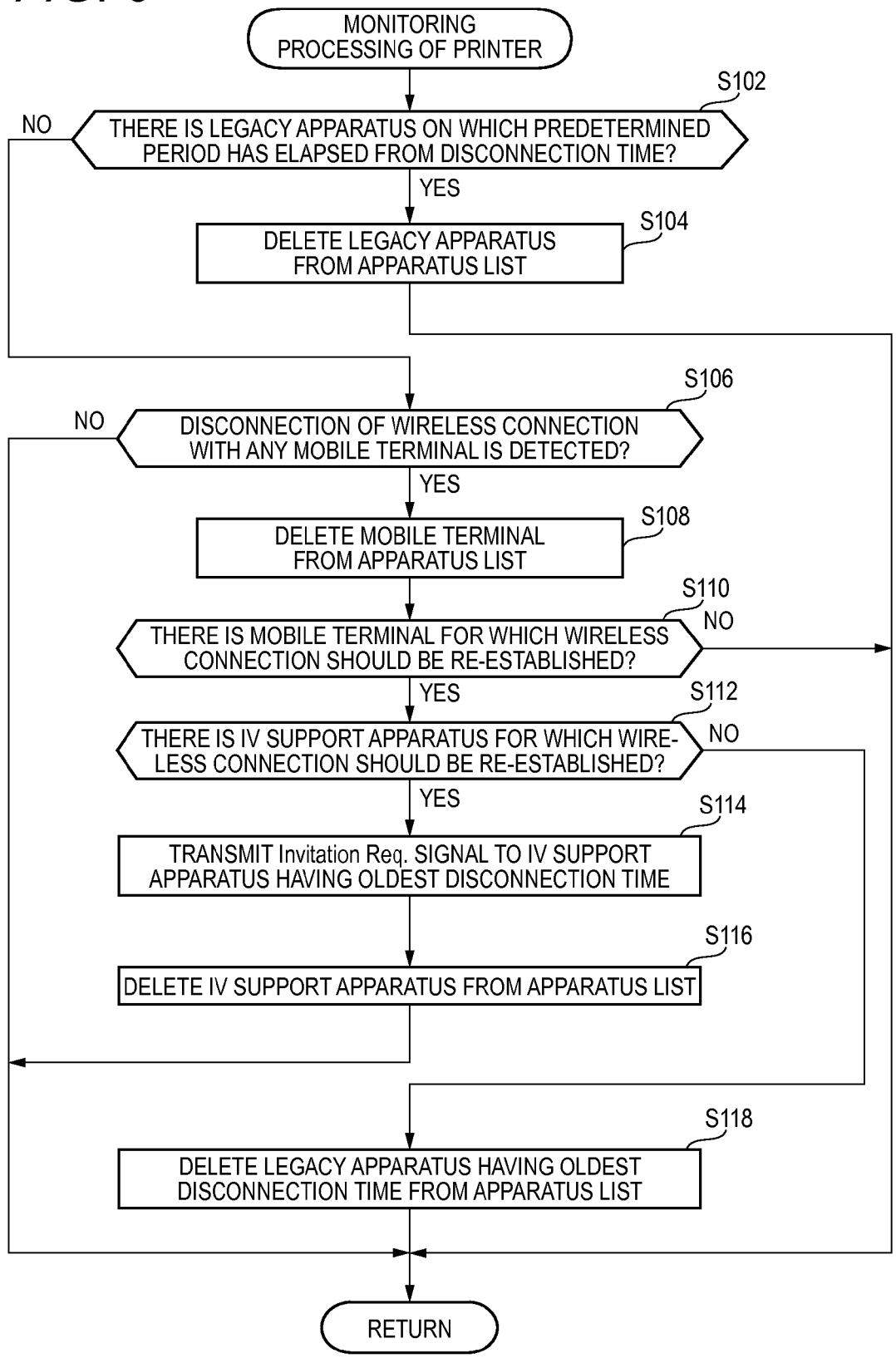
FIG. 6 is a flowchart of monitoring processing of a printer.

(Monitoring Processing of Printer: FIG. 6)

Subsequently, the details of monitoring processing which is executed by the CPU 32 of the printer PR will be described referring to FIG. 6. In the monitoring processing, the CPU 32 updates the apparatus list 50 (see FIG. 1) according to an event. Accordingly, the CPU 32 is able to re-establish a wireless connection with a legacy apparatus or an IV support apparatus.

In S102, the CPU 32 determines whether there is a legacy apparatus on which a predetermined period (for example, 5 minutes) has elapsed from the disconnection time. Specifically, the CPU 32 first acquires one or more relevant information, in which the apparatus type "legacy" is described, from the apparatus list 50. Then, the CPU 32 calculates the difference between "disconnection time" included in the relevant information and the current time for each of the one or more relevant information. When there is relevant information (hereinafter, referred to as "target relevant information") having the difference greater than the predetermined period out of the one or more relevant information, the CPU 32 determines to be YES in S102 and proceeds to S104. When there is no target relevant information out of the one or more relevant information, the CPU 32 determines to be NO in S102 and proceeds to S106.

In S104, the CPU 32 deletes the target relevant information from the apparatus list 50. That is, the CPU 32 deletes relevant information of a legacy apparatus, on which the predetermined period has elapsed from the disconnection time, from the apparatus list 50. Accordingly, for a legacy apparatus in which the inhibition flag "ON" is described, it is not determined to be YES in S6 of FIG. 4. As a result, when an inhibition flag is present (that is, in case of the inhibition flag "ON"), while a connection request from a legacy apparatus is rejected based on the presence of the inhibition flag, the inhibition flag is deleted from the apparatus list 50, whereby it is possible to establish a wireless connection with the legacy apparatus in response to the connection request from the legacy apparatus. If S104 ends, the process returns to S102.

In S106, the CPU 32 determines whether disconnection of a wireless connection with any mobile terminal, for which a wireless connection with the printer PR is established, is detected. Specifically, when a disconnection request is received from any mobile terminal, the CPU 32 determines to be YES in S106. The disconnection request includes the MAC address of the mobile terminal. The CPU 32 transmits a connection confirmation signal regularly in processing (not shown) to monitor reception of a response signal from each mobile terminal, for which a wireless connection with the printer PR is established. The response signal includes the MAC address of the mobile terminal. Accordingly, the CPU 32 compares each MAC address registered in the apparatus list 50 and the MAC address included in each response signal, thereby specifying a mobile terminal (that is, the MAC address) which has not transmitted a response signal. When a mobile terminal which has not transmitted a response signal is specified, the CPU 32 determines to be YES in S106.

In S108, the CPU 32 deletes relevant information of a mobile terminal, for which disconnection of a wireless connection is detected, from the apparatus list 50. That is, the CPU 32 deletes the relevant information including the MAC address of the mobile terminal, for which disconnection of a wireless connection is detected.

Next, in S110, the CPU 32 determines whether there are one or more mobile terminals for which a wireless connection should be re-established. Specifically, when there are one or more relevant information (hereinafter, referred to as "disconnection relevant information"), in which the disconnection time is described, referring to the apparatus list 50, the CPU 32 determines that there are one or more mobile terminals for which a wireless connection should be re-established (YES in S110) and proceeds to S112. When there is no disconnection relevant information, the CPU 32 determines that there is no mobile terminal for which a wireless connection should be re-established (NO in S110) and returns to S102. As described above, in the apparatus list 50, while the disconnection time can be described in relevant information of a legacy apparatus or an IV support apparatus (see S56 and S58 of FIG. 4), the disconnection time is not described in relevant information of an IV non-support apparatus (see S60).

In S112, the CPU 32 determines whether there are one or more IV support apparatus for which a wireless connection should be re-established. Specifically, when there are one or more relevant information (hereinafter, referred to as "support disconnection relevant information"), in which apparatus type "IV support", out of one or more disconnection relevant information, the CPU 32 determines that there are one or more IV support apparatus for which a wireless connection should be re-established (YES in S112) and proceeds to S114. When there is no support disconnection relevant information, the CPU 32 determines that there is no IV support apparatus for which a wireless connection should be re-established (NO in S112) and proceeds to S118.

In S114, the CPU 32 transmits an Invitation Req. signal to one IV support apparatus out of one or more IV support apparatuses, for which a wireless connection should be re-established. Specifically, when there is only one support disconnection relevant information, the CPU 32 transmits the Invitation Req. signal with the MAC address included in the one support disconnection relevant information as a transmission destination. When there are two or more support disconnection relevant information, the CPU 32 transmits the Invitation Req. signal with the MAC address associated with the oldest disconnection time out of two or more MAC addresses included in the two support disconnection relevant information as a transmission destination.

Next, in S116, the CPU 32 deletes the relevant information including the MAC address of the transmission destination of the Invitation Req. signal of S114 from the apparatus list 50. That is, the CPU 32 deletes the relevant information of the IV support apparatus of the transmission destination of the Invitation Req. signal. If S116 ends, the process returns to S102.

When the Invitation Req. signal is transmitted to the IV support apparatus, usually, the CPU 32 receives an Invitation Res. signal from the IV support apparatus. Thereafter, the CPU 32 receives a connection request (that is, an Association Req. signal) from the IV support apparatus, and thus determines to be YES in S2 of FIG. 4. As a result, the CPU 32 is able to re-establish a wireless connection with the IV support apparatus (S62 of FIG. 4).

In a stage where S118 (that is, when there is no IV support apparatus for which a wireless connection should be re-established) is executed, all of one or more disconnection relevant information include the apparatus type "legacy". This is because it is determined in S112 that there is no disconnection relevant information including the apparatus type "IV support" and in S60 of FIG. 4, relevant information of an IV non-support apparatus, for which a wireless connection is disconnected, is deleted. In a stage where S118 is executed, all of one or more disconnection relevant information are relevant information of a legacy apparatus on which the predetermined period (see S102) has not elapsed from the disconnection time. This is because relevant information of a legacy apparatus, on which the predetermined period has elapsed from the disconnection time, is deleted in S104.

In S118, when there is only one disconnection relevant information, the CPU 32 deletes the one disconnection relevant information from the apparatus list 50. When there are two or more disconnection relevant information, the CPU 32 deletes one disconnection relevant information including the oldest disconnection time out of the two or more disconnection relevant information from the apparatus list 50. Accordingly, the CPU 32 is able to delete relevant information of a legacy apparatus, on which the predetermined period has not elapsed from the disconnection time, from the apparatus list 50. As a result, when a connection request is received from the legacy apparatus (YES in S2 of FIG. 4), the printer PR is able to re-establish a wireless connection with the legacy apparatus (NO in S6). If S118 ends, the process returns to S102.

As described above, in the processing of FIG. 6, when there are both of an IV support apparatus and a legacy apparatus for which a wireless connection should be re-established, the printer PR preferentially re-establishes a wireless connection with the IV support apparatus (YES in S112). The reason is as follows. If a method of preferentially re-establishing a wireless connection with the legacy apparatus is used, the printer PR is unable to re-establish a wireless connection with the legacy apparatus until a connection request is automatically transmitted from the legacy apparatus. In contrast, if a method of preferentially re-establishing a wireless connection with the IV support apparatus is used, the printer PR is able to transmit the Invitation Req. signal to the IV support apparatus immediately after the number of connections of the printer PR becomes less than the upper limit number (S114), and as a result, it is possible to re-establish a wireless connection with the IV support apparatus promptly. According to this illustrative embodiment, the printer PR is able to re-establish a wireless connection with an apparatus (that is, an IV support apparatus), for which a wireless connection should be re-established, promptly after the number of connections of the printer PR becomes less than the upper limit number.

Figure 7:
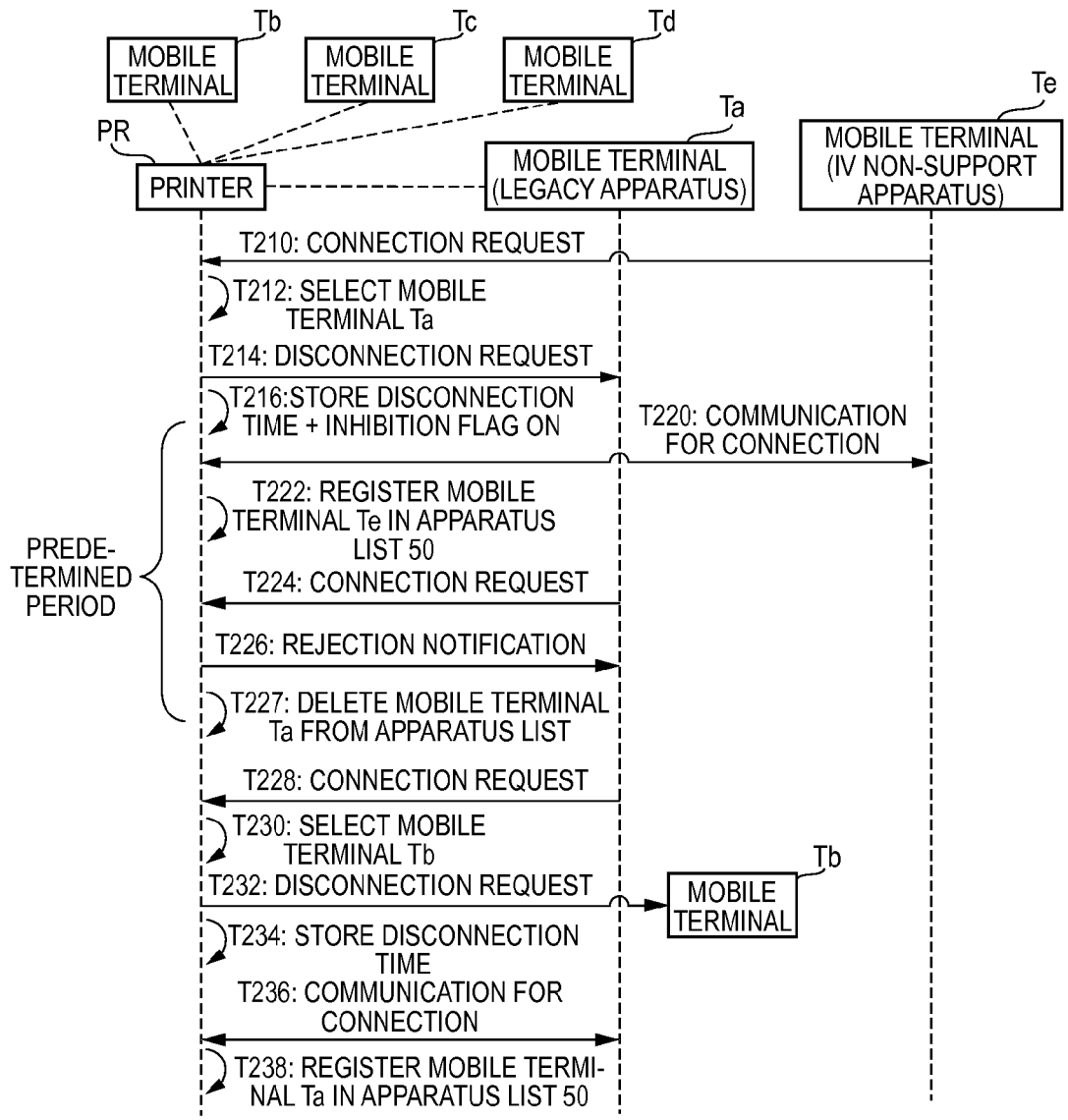
FIG. 7 is a sequence diagram of a case A where a disconnection request is transmitted to a legacy apparatus.

(Case A: FIG. 7)

Subsequently, various specific cases which are realized by the operation of the printer PR described referring to FIGS. 2 to 6 will be described. In an initial state of FIG. 7, the printer PR establishes a wireless connection with each of four mobile terminals Ta to Td. That is, the number of connections of the printer PR reaches the upper limit number "4".

In T210, when a connection request is received from the mobile terminal Te (YES in S2 of FIG. 4), the printer PR determines that the number of connections of the printer PR matches the upper limit number (YES in S4), and determines that the inhibition flag of the mobile terminal Te is not "ON" (NO in S6). In this case, in T212, the printer PR selects a mobile terminal to be disconnected referring to an upper apparatus list 50 of FIG. 7 (S10). Specifically, in T212, the printer PR selects the mobile terminal Ta (that is, relevant information including "MACa") which is a used legacy apparatus ("1" in S12 of FIG. 5, S14).

In T214, the printer PR transmits a disconnection request to the mobile terminal Ta to disconnect the wireless connection with the mobile terminal Ta (S52 of FIG. 4). Accordingly, the number of connections of the printer PR becomes less than the upper limit number. Then, in T216, the printer PR describes the disconnection time and the inhibition flag "ON" in the relevant information of the mobile terminal Ta (S56).

In T220, the printer PR executes communication of various signals for establishing a wireless connection with the mobile terminal Te to establish a wireless connection with the mobile terminal Te (S62 of FIG. 4). Accordingly, the number of connections of the printer PR reaches the upper limit number again. Then, in T222, the printer PR registers the relevant information of the mobile terminal Te in the apparatus list 50 (S64).

Even if an instruction is not given from the user after a wireless connection with the printer PR is disconnected due to reception of the disconnection request (T214) from the printer PR, the mobile terminal Ta, which is a legacy apparatus, automatically transmits a connection request to the printer PR.

In T224, when the connection request is received from the mobile terminal Ta (YES in S2 of FIG. 4), the printer PR determines that the number of connections of the printer PR matches the upper limit number (YES in S4), and determines that the inhibition flag of the mobile terminal Ta is "ON" (YES in S6). Accordingly, in T226, the printer PR transmits a rejection notification to the mobile terminal Ta and does not establish a wireless connection with the mobile terminal Ta.

As described above, in this illustrative embodiment, the printer PR does not disconnect a wireless connection with other apparatuses even if the connection request is received from the mobile terminal Ta (T224) in a state where the number of connections of the printer PR matches the upper limit number before a predetermined period elapses from a time when the wireless connection with the mobile terminal Ta, which is a legacy apparatus, is disconnected. Therefore, it is possible to suppress the occurrence of a case where a wireless connection with other apparatuses is disconnected in response to the connection request automatically transmitted from the mobile terminal Ta in a situation where only a short time has elapsed after the wireless connection with the mobile terminal Ta is disconnected.

In T227, the printer PR determines that the predetermined period has elapsed after the wireless connection with the mobile terminal Ta, which is a legacy apparatus, is disconnected (YES in S102 of FIG. 6), and deletes the relevant information of the mobile terminal Ta from the apparatus list 50 (S104).

Thereafter, in T228, when a connection request is received from the mobile terminal Ta (YES in S2 of FIG. 4), the printer PR determines that the number of connections of the printer PR matches the upper limit number (YES in S4), and determines that the inhibition flag of the mobile terminal Ta is not "ON" (NO in S6). In T227, the relevant information including the inhibition flag of the mobile terminal Ta is deleted from the apparatus list 50. In this case, in T230, the printer PR selects a mobile terminal to be disconnected referring to a lower apparatus list 50 of FIG. 7 (S10). Specifically, the printer PR selects the mobile terminal Tb (that is, relevant information including "MACb") which is a used IV support apparatus ("1" in S22 of FIG. 5, S24).

In T232, the printer PR transmits a disconnection request to the mobile terminal Tb to disconnect the wireless connection with the mobile terminal Tb (S52 of FIG. 4). Accordingly, the number of connections of the printer PR becomes less than the upper limit number. Then, in T234, the printer PR describes the disconnection time in the relevant information of the mobile terminal Tb (S58).

In T236, the printer PR executes communication of various signals for establishing a wireless connection with the mobile terminal Ta to establish a wireless connection with the mobile terminal Ta (S62 of FIG. 4). Accordingly, the number of connections of the printer PR reaches the upper limit number again. Then, in T238, the printer PR registers the relevant information of the mobile terminal Ta in the apparatus list 50 (S64).

As described above, in this illustrative embodiment, when the predetermined period has elapsed after the wireless connection with the mobile terminal Ta, which is a legacy apparatus, is disconnected and when a connection request is received from the mobile terminal Ta (T228) in a state where the number of connections of the printer PR matches the upper limit number, the printer PR disconnects a wireless connection with the mobile terminal Tb (T232). Accordingly, the printer PR is able to appropriately re-establish a wireless connection with the mobile terminal Ta.

Figure 8:
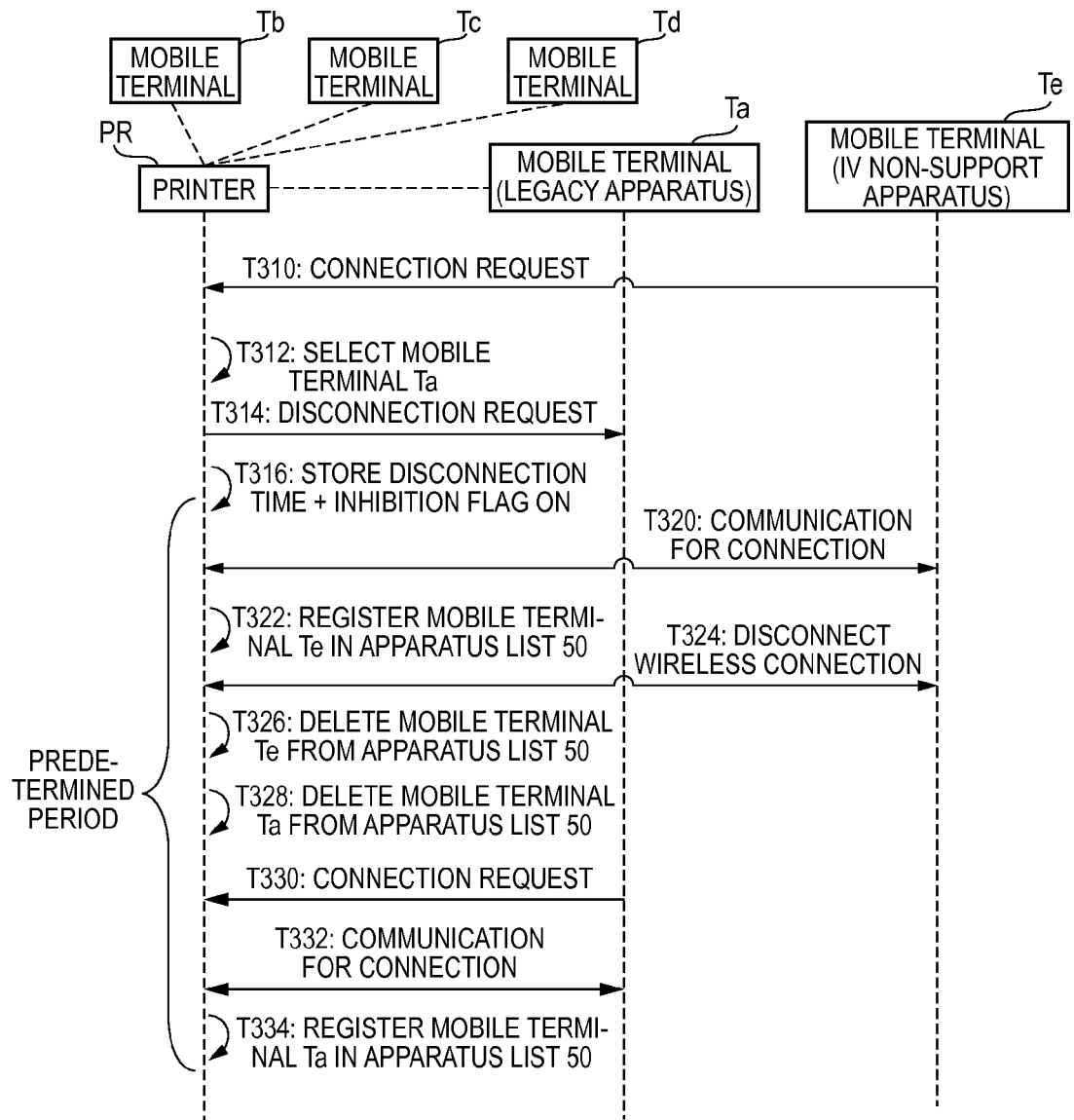
FIG. 8 is a sequence diagram of a case B where a disconnection request is transmitted to a legacy apparatus.

(Case B: FIG. 8)

An initial state of FIG. 8 is similar to the initial state of FIG. 7. T310 to T322 are similar to T210 to T222 of FIG. 7.

In T324, the printer PR receives a disconnection request from the mobile terminal Te and detects that the wireless connection with the mobile terminal Te is disconnected (YES in S106 of FIG. 6). Accordingly, the number of connections of the printer PR becomes less than the upper limit number. In this case, in T326, the printer PR deletes the relevant information of the mobile terminal Te from the apparatus list 50 (S108).

In T328, since there is one disconnection relevant information (that is, relevant information including "MACa") in which the disconnection time is described in the apparatus list 50, the printer PR determines that there is the mobile terminal Ta for which a wireless connection should be re-established (YES in S110 of FIG. 6). In T328, since there is no disconnection relevant information including the apparatus type "IV support", the printer PR determines that there is no IV support apparatus for which a wireless connection should be re-established (NO in S112). As a result, the printer PR deletes disconnection relevant information including the apparatus type "legacy", that is, the relevant information of the mobile terminal Ta from the apparatus list 50 (S118). Accordingly, it is possible to delete the relevant information of the mobile terminal Ta from the apparatus list 50 before the predetermined period elapses from the disconnection time.

In T330, when a connection request is received from the mobile terminal Ta (YES in S2 of FIG. 4), the printer PR determines that the number of connections of the printer PR does not match the upper limit number (NO in S4). Then, in T332, the printer PR executes communication of various signals for establishing a wireless connection with the mobile terminal Ta to establish a wireless connection with the mobile terminal Ta (S62). Here, the respective operations corresponding to T110 and T111 of FIG. 3 are executed on the printer PR and the mobile terminal Ta, and the mobile terminal Ta already acquires various kinds of information for establishing a wireless connection with the printer PR. Accordingly, in T332, communication of WSC Exchange is not executed. If T332 is executed, the number of connections of the printer PR reaches the upper limit number again. Then, in T334, the printer PR registers the relevant information of the mobile terminal Ta in the apparatus list 50 (S64).

As described above, in this illustrative embodiment, when a connection request is received from the mobile terminal Ta (T330) in a state the number of connections of the printer PR is less than the upper limit number before the predetermined period elapses from a time when the wireless connection with the mobile terminal Ta, which is a legacy apparatus, is disconnected, the printer PR is able to appropriately re-establish a wireless connection with the mobile terminal Ta (T332).

Figure 9:
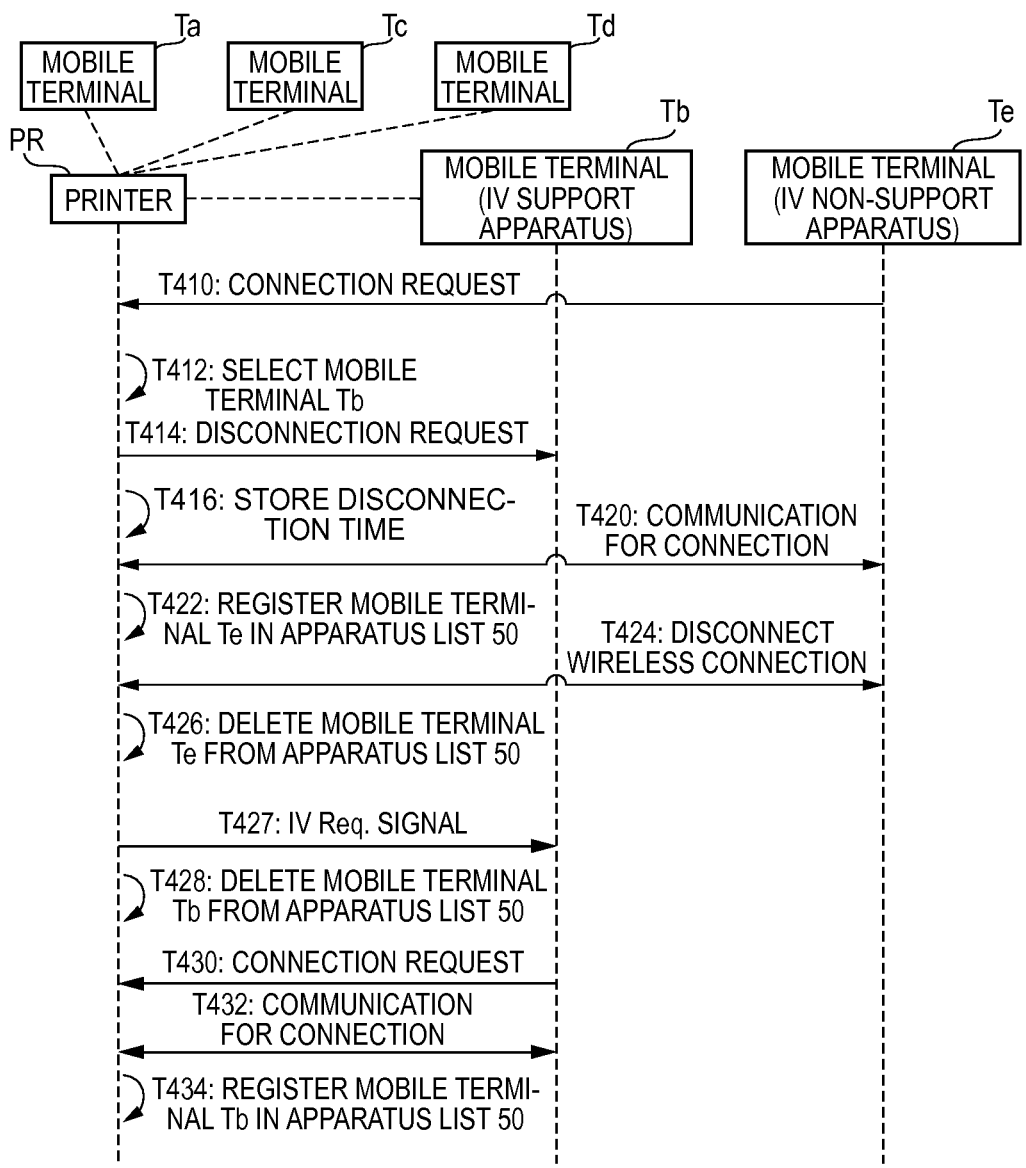
FIG. 9 is a sequence diagram of a case C where a disconnection request is transmitted to an IV support apparatus.

(Case C: FIG. 9)

An initial state of FIG. 9 is similar to the initial state of FIG. 7. T410 is similar to T210 of FIG. 7.

In T412, the printer PR selects a mobile terminal to be disconnected referring to an apparatus list 50 of FIG. 9 (S10 of FIG. 4). Specifically, in T412, the printer PR selects the mobile terminal Tb (that is, relevant information including "MACb"), which is a used IV support apparatus ("1" in S22, S24), without selecting the mobile terminal Ta (that is, relevant information including "MACa"), which is an in-use legacy apparatus ("0" in S12 of FIG. 5).

In T414, the printer PR transmits a disconnection request to the mobile terminal Tb to disconnect the wireless connection with the mobile terminal Tb (S52 of FIG. 4). Accordingly, the number of connections of the printer PR becomes less than the upper limit number. Then, in T416, the printer PR describes the disconnection time in the relevant information of the mobile terminal Tb (S58). T420 and T422 are similar to T220 and T222 of FIG. 7. T424 and T426 are similar to T324 and T326 of FIG. 8.

In T427, since there is one disconnection relevant information (that is, relevant information including "MACb") in which the disconnection time is described in the apparatus list 50, the printer PR determines that there is the mobile terminal Tb for which a wireless connection should be re-established (YES in S110 of FIG. 6). In T427, since there is disconnection relevant information including the apparatus type "IV support", the printer PR determines that there is an IV support apparatus for which a wireless connection should be re-established (YES in S112). As a result, the printer PR transmits the Invitation Req. signal to the mobile terminal Tb (S114). Then, in T428, the printer PR deletes the relevant information of the mobile terminal Tb from the apparatus list 50 (S116).

In T430, when a connection request is received from the mobile terminal Tb (YES in S2 of FIG. 4), the printer PR determines that the number of connections of the printer PR does not match the upper limit number (NO in S4). Then, in T432, the printer PR executes communication of various signals for establishing a wireless connection with the mobile terminal Tb to establish a wireless connection with the mobile terminal Tb (S62). Accordingly, the number of connections of the printer PR reaches the upper limit number again. Then, in T434, the printer PR registers the relevant information of the mobile terminal Tb in the apparatus list 50 (S64).

As described above, in this illustrative embodiment, when the number of connections of the printer PR becomes less than the upper limit number (T424) after the wireless connection with the mobile terminal Tb, which is an IV support apparatus, is disconnected, the printer PR transmits the Invitation Req. signal to the mobile terminal Tb (T427) and is able to appropriately re-establish a wireless connection with the mobile terminal Tb (T430, T432).

Figure 10:
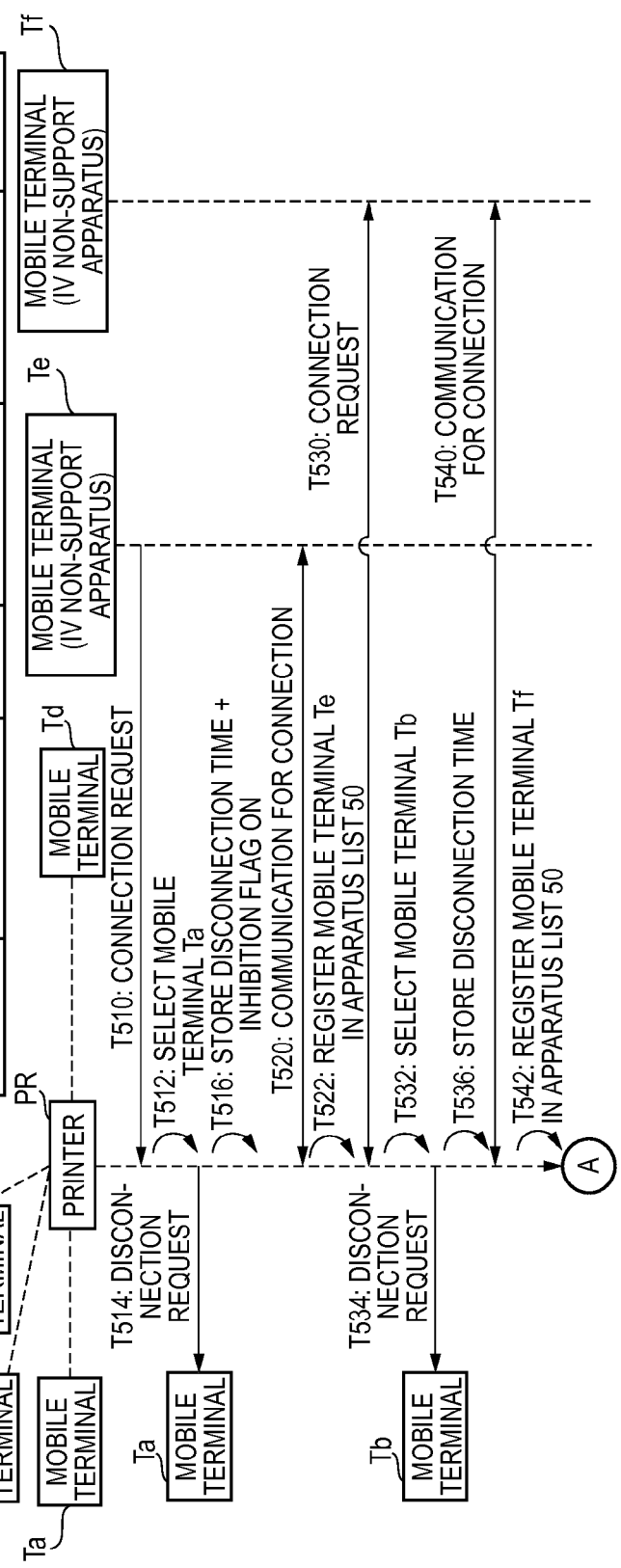
FIG. 10 is a sequence diagram of a case D where a disconnection request is transmitted to two apparatuses.

(Case D: FIG. 10)

An initial state of FIG. 10 is similar to the initial state of FIG. 7. T510 to T522 are similar to T210 to T222 of FIG. 7.

In T530, when a connection request is received from the mobile terminal Tf (YES in S2 of FIG. 4), the printer PR determines that the number of connections of the printer PR matches the upper limit number (YES in S4), and determines that the inhibition flag of the mobile terminal Tf is not "ON" (NO in S6). In this case, in T532, the printer PR selects a mobile terminal to be disconnected referring to a lower apparatus list 50 of FIG. 10 (S10). Specifically, in T532, the printer PR selects the mobile terminal Tb (that is, relevant information including "MACb"), which is a used IV support apparatus ("1" in S22 of FIG. 5, S24). The mobile terminal Ta, which is a used legacy apparatus, is not selected as a mobile terminal to be disconnected ("0" in S12) since the wireless connection is already disconnected (that is, since the disconnection time is described). T534 and T536 are similar to T414 and T416 of FIG. 9.

In T540, the printer PR executes communication of various signals for establishing a wireless connection with the mobile terminal Tf to establish a wireless connection with the mobile terminal Tf (S62 of FIG. 4). Accordingly, the number of connections of the printer PR reaches the upper limit number again. Then, in T542, the printer PR registers the relevant information of the mobile terminal Tf in the apparatus list 50 (S64).

Figure 11:
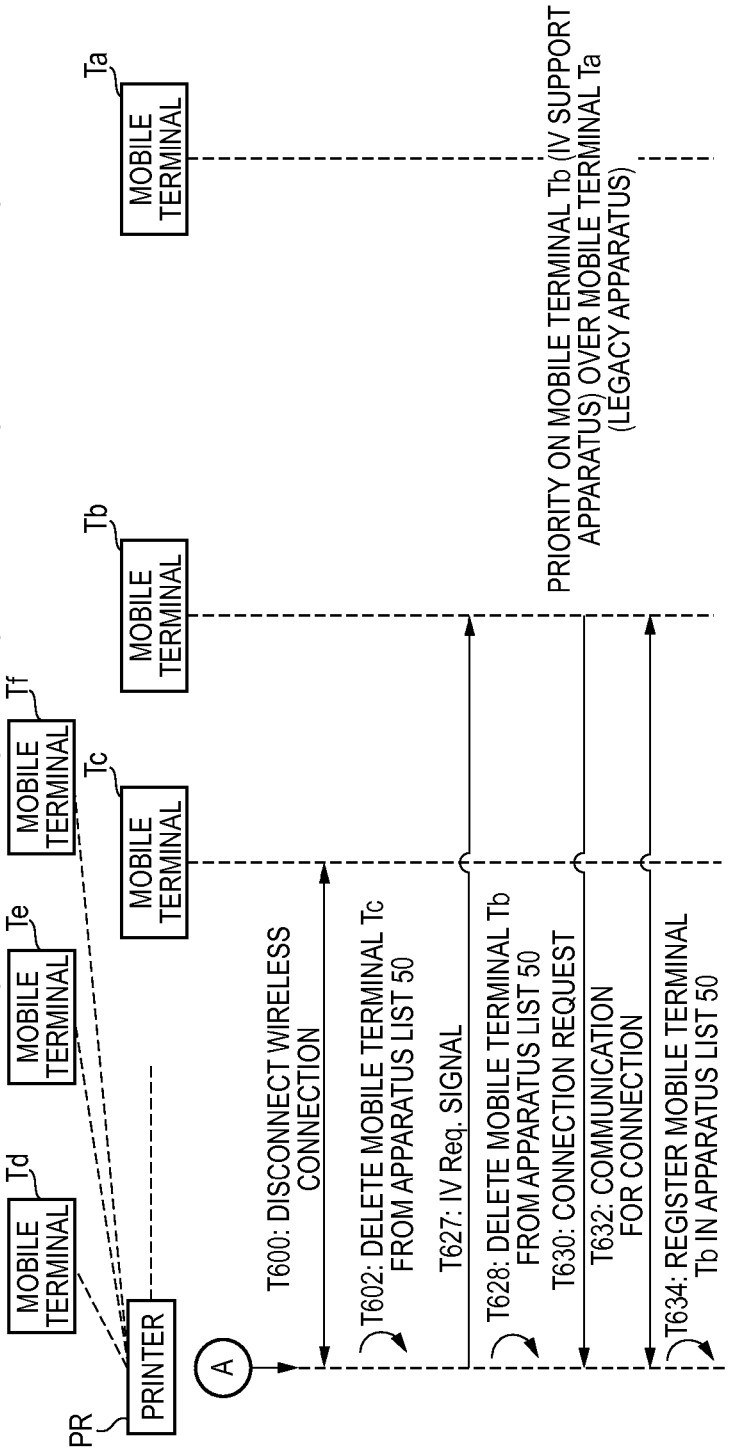
FIG. 11 is a sequence diagram continuing from FIG. 10 and showing a case where a wireless connection of an IV support apparatus is preferentially re-established.

(Continuation of FIG. 10: FIG. 11)

FIG. 11 is a sequence diagram which is the continuation of FIG. 10. In T600, the printer PR receives a disconnection request from the mobile terminal Tc and detects that the wireless connection with the mobile terminal Tc is disconnected (YES in S106 of FIG. 6). Accordingly, the number of connections of the printer PR becomes less than the upper limit number. In this case, in T602, the printer PR deletes the relevant information of the mobile terminal Tc from the apparatus list 50 (S108).

In T627, since there are two disconnection relevant information (that is, relevant information including "MACa" and relevant information including "MACb") in which the disconnection time is described in the apparatus list 50, the printer PR determines that there are two mobile terminals Ta and Tb for which a wireless connection should be re-established (YES in S110 of FIG. 6). In T627, since there is disconnection relevant information (that is, relevant information including "MACb") including the apparatus type "IV support", the printer PR determines that there is an IV support apparatus for which a wireless connection should be re-established (YES in S112). As a result, the printer PR transmits the Invitation Req. signal to the mobile terminal Tb (S114). T628 to T634 are similar to T428 to T434 of FIG. 9.

As described above, in this illustrative embodiment, when there are both of an IV support apparatus and a legacy apparatus for which a wireless connection should be re-established, the printer PR preferentially re-establishes a wireless connection with the mobile terminal Tb, which is an IV support apparatus. Accordingly, the printer PR is able to re-establish a wireless connection with an apparatus (that is, an IV support apparatus), for which a wireless connection should be re-established, promptly after the number of connections of the printer PR becomes less than the upper limit number.

Figure 12:
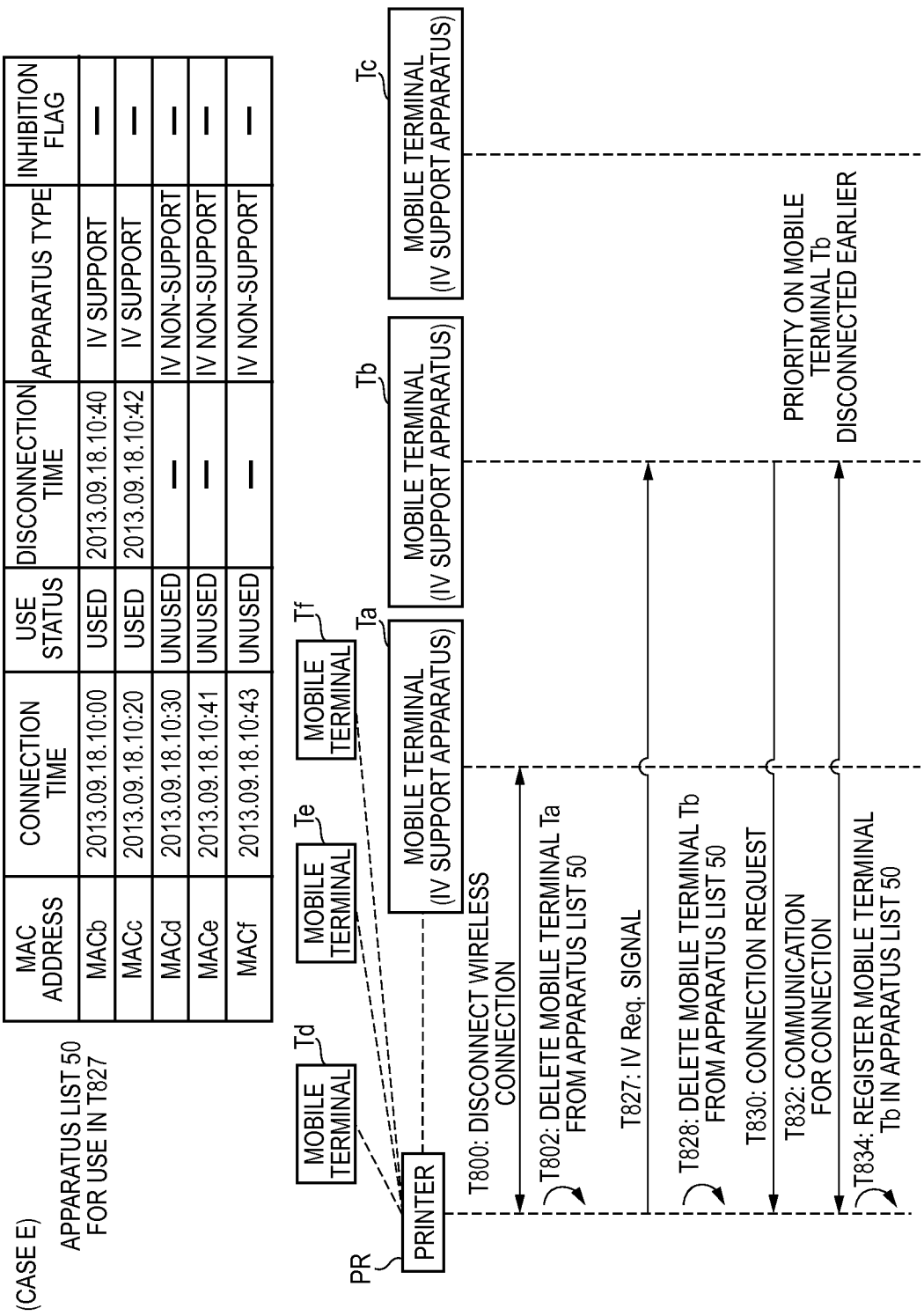
FIG. 12 is a sequence diagram of a case E where a wireless connection with an apparatus, for which a wireless connection is disconnected earlier, is preferentially re-established.

(Case E: FIG. 12)

In an initial state of FIG. 12, the printer PR establishes a wireless connection with each of four mobile terminals Ta and Td to Tf. That is, the number of connections of the printer PR reaches the upper limit number "4". The printer PR has transmitted the disconnection request to the mobile terminals Tb and Tc formerly to disconnect the wireless connection. Therefore, in the apparatus list 50, the disconnection time is described in the relevant information of each of the mobile terminals Tb and Tc.

In T800, the printer PR receives the disconnection request from the mobile terminal Ta and detects that the wireless connection with the mobile terminal Ta is disconnected (YES in S106 of FIG. 6). Accordingly, the number of connections of the printer PR becomes less than the upper limit number. In this case, in T802, the printer PR deletes the relevant information of the mobile terminal Ta from the apparatus list 50 (S108).

In T827, since there are two disconnection relevant information (that is, relevant information including "MACb" and relevant information including "MACc") in which the disconnection time is described in the apparatus list 50, the printer PR determines that there are the two mobile terminals Tb and Tc for which a wireless connection should be re-established (YES in S110 of FIG. 6). In T827, since there are two disconnection relevant information including the apparatus type "IV support", the printer PR determines that there are two IV support apparatuses for which a wireless connection should be re-established (YES in S112). Accordingly, in T827, the printer PR selects one disconnection relevant information (that is, relevant information including "MACb"), in which the oldest disconnection time is described, out of the two disconnection relevant information including the apparatus type "IV support" and transmits the Invitation Req. signal to the mobile terminal Tb (S114). T828 to T834 are similar to T428 to T434 of FIG. 9.

As described above, in this illustrative embodiment, when there are two or more IV support apparatuses for which a wireless connection should be re-established, the printer PR preferentially re-establishes a wireless connection with the mobile terminal Tb, for which a wireless connection with the printer PR is disconnected earlier. Therefore, it is possible to suppress the occurrence of a case where a wireless connection with the mobile terminal Tb is not re-established over a long period.

(Correspondence)

The printer PR and the printing function are respectively examples of "wireless communication apparatus" and "image processing function". A legacy apparatus and a WFD apparatus (that is, an IV support apparatus and an IV non-support apparatus) are respectively examples of "first type apparatus" and "second type apparatus". An IV support apparatus and an IV non-support apparatus are respectively examples of "support apparatus" and "non-support apparatus". The WFD system is an example of "specific wireless communication system". The G/O negotiation of the WFD system is an example of "a mechanism for executing wireless communication for determining a base station and a client station of a wireless network". The Invitation Req. signal is an example of "predetermined command".

In the case A of FIG. 7, the mobile terminal Te and the mobile terminal Ta are respectively examples of "first specific apparatus" and "first target apparatus". The connection request of T210 and the disconnection request of T214 are respectively examples of "first wireless connection request" and "first disconnection request". A case where the connection request of T224 is received is an example of "a case where a wireless connection request is received from a first target apparatus in a state where the number of connections matches the upper limit number before a predetermined period elapses". A case where the connection request of T228 is received is an example of "a case where a predetermined period has elapsed and a wireless connection request is received from a first target apparatus in a state where the number of connections matches the upper limit number".

In the case B of FIG. 8, a case where the connection request of T330 is received is an example of "a case where a wireless connection request is received from a first target apparatus in a state where the number of connections is less than the upper limit number before a predetermined period elapses".

In the case D of FIG. 10, the mobile terminal Te, the mobile terminal Tf, the mobile terminal Ta, and the mobile terminal Tb are respectively examples of "first specific apparatus", "second specific apparatus", "first target apparatus", and "second target apparatus". The connection request of T510, the connection request of T530, the disconnection request of T514, and the disconnection request of T534 are respectively examples of "first wireless connection request", "second wireless connection request", "first disconnection request", and "second disconnection request".

The processing of S2, the processing (that is, the processing of FIG. 5) of S10, the processing of S52, and the processing of S62 of FIG. 4 are respectively examples of "receiving operation", "selecting operation", "disconnecting operation", and "establishing operation". The processing of S6, the processing of S8, and the processing of S56 of FIG. 4, and the processing of S102 and the processing of S104 of FIG. 6 are examples of "disconnecting operation".

While the present invention has been shown and described with reference to certain illustrative embodiments thereof, it will be understood by those skilled in the art that various changes in form and details may be made therein without departing from the spirit and scope of the invention as defined by the appended claims.

Modified Illustrative Embodiment 1

In the above-described illustrative embodiment, the CPU 32 of the printer PR selects a used apparatus as a mobile terminal to be disconnected without selecting an unused or an in-use apparatus in the processing of FIG. 5. Alternatively, the CPU 32 may select an unused or a used apparatus without selecting an in-use apparatus. In another modified illustrative embodiment, the CPU 32 may select a mobile terminal to be disconnected regardless of the use status. That is, "N1 apparatuses" may include an apparatus in which an application is being activated.

Modified Illustrative Embodiment 2

In the above-described illustrative embodiment, the CPU 32 of the printer PR preferentially selects a legacy apparatus as a mobile terminal to be disconnected over an IV support apparatus in the processing of FIG. 5. Alternatively, the CPU 32 may preferentially select an IV support apparatus as a mobile terminal to be disconnected over a legacy apparatus. The printer PR is unable to re-establish a wireless connection with a legacy apparatus if a connection request automatically transmitted from the legacy apparatus is not received. Accordingly, when a function of automatically transmitting a connection request is invalidated in a legacy apparatus, the printer PR is unable to automatically receive a connection request from the legacy apparatus and is unable to re-establish a wireless connection with the legacy apparatus. In contrast, the printer PR is able to transmit the Invitation Req. signal to an IV support apparatus after a wireless connection with the IV support apparatus is disconnected. Accordingly, the printer PR is able to appropriately re-establish a wireless connection with the IV support apparatus. That is, the printer PR may preferentially select the IV support apparatus as a mobile terminal to be disconnected over the legacy apparatus to increase the possibility of re-establishment of a wireless connection. In general, the "selecting operation" may preferentially select the second type apparatus as the first target apparatus over the first type apparatus.

Modified Illustrative Embodiment 3

The CPU 32 of the printer PR may not execute the processing of S102 and S104 in the processing of FIG. 6. That is, the "establishing operation" may not re-establish a wireless connection with the first target apparatus when a wireless connection request is received from the first target apparatus in a state where the number of connections is less than the upper limit number before a predetermined period elapses.

Modified Illustrative Embodiment 4

In the processing of FIG. 6, when there are both of an IV support apparatus and a legacy apparatus for which a wireless connection should be re-established, the CPU 32 of the printer PR preferentially re-establishes a wireless connection with the IV support apparatus. Alternatively, the CPU 32 may preferentially re-establish a wireless connection with the legacy apparatus. For example, in an environment where an apparatus (for example, a PC, a server, or the like) capable of frequently executing communication with the printer PR is used as a legacy apparatus, it is preferable to use a configuration in which a wireless connection with the legacy apparatus is preferentially re-established. That is, the "establishing operation" may preferentially re-establish a wireless connection with the first target apparatus as the first type apparatus over the second target apparatus, which is a support apparatus.

Modified Illustrative Embodiment 5

The CPU 32 of the printer PR may activate so-called SoftAP to cause the printer PR to operate as a pseudo AP, instead of causing the printer PR to operate as the G/O apparatus of the WFD system. In this modified illustrative embodiment, the CPU 32 is able to form a wireless network in which the printer PR operates as a base station.

Modified Illustrative Embodiment 6

The "wireless communication apparatus" is not limited to the printer PR, and may be other kinds of apparatus (for example, a scanner, a facsimile machine, a telephone, a multi-function peripheral, a wireless access point, a PC, a mobile terminal, and the like). In general, the "wireless communication apparatus" may be any kind of apparatus insofar as the apparatus operates as a base station of a wireless network and is able to establish a wireless connection with an external apparatus. For example, when a scanner is used as "wireless communication apparatus", a scanning function is an example of "image processing function".

Modified Illustrative Embodiment 7

In the above-described illustrative embodiment, the CPU 32 of the printer PR executes the program 36 (that is, software) in the memory 34, whereby the respective kinds of processing of FIGS. 2 to 6 are executed. Alternatively, at least one of the respective kinds of processing of FIGS. 2 to 6 may be realized by hardware, such as a logic circuit.

The technical elements described in this specification or the drawings exhibit technical utility singly or in various combinations and are not limited to the combinations described in the appended claims as filed. The techniques illustrated in this specification or the drawings simultaneously attain a plurality of purposes, and attaining one of the purposes per se offers technical utility.

What is claimed is:
1. A wireless communication apparatus comprising:
a processor; and memory storing instructions that, when executed by the processor, cause the wireless communication apparatus to perform operations comprising:

in a state where a number of connections which is a number of wireless connections currently being established by the wireless communication apparatus operating as a base station of a wireless network matches an upper limit number, receiving a first wireless connection request from a first specific apparatus;

when the first wireless connection request is received from the first specific apparatus, selecting a first target apparatus to be disconnected, from among N1 apparatuses which currently establish a wireless connection with the wireless communication apparatus (where N1 is an integer equal to or greater than two), wherein when the N1 apparatuses include a plurality of types of apparatuses including a first type apparatus which is connectable with the wireless communication apparatus and not supported with the wireless connection according to a specific wireless communication system, and a second type apparatus which is connectable with the wireless communication apparatus and supported with the wireless connection according to the specific wireless communication system, the selecting preferentially selects, based on a disconnection priority determined in advance for the plurality of types of apparatuses, an apparatus of a type having a highest disconnection priority as the first target apparatus;

transmitting a first disconnection request to the first target apparatus to disconnect a wireless connection with the first target apparatus; and establishing a wireless connection with the first specific apparatus after the wireless connection with the first target apparatus is disconnected, wherein the first type apparatus has a function to automatically transmit a reconnection request to the wireless communication apparatus after being disconnected from the wireless communication apparatus by receiving the first disconnection request from the wireless communication apparatus, and wherein the selecting preferentially selects the first type apparatus as the first target apparatus over the second type apparatus.

2. The wireless communication apparatus according to claim 1, wherein the operations further comprise:

when a wireless connection request is received from the first target apparatus in a state where the number of connections matches the upper limit number, and the wireless connection request is received before a predetermined period elapses from a time when the first type apparatus is selected as the first target apparatus and the wireless connection with the first target apparatus is disconnected, inhibiting disconnection of a wireless connection currently established by the wireless communication apparatus; and when a wireless connection request is received from the first target apparatus in a state where the number of connections matches the upper limit number, and the wireless connection request is received after the predetermined period has elapsed from the time when the first type apparatus is selected as the first target apparatus and the wireless connection with the first target apparatus is disconnected, permitting disconnection of a wireless connection currently established by the wireless communication apparatus, wherein the first type apparatus has a function of automatically transmitting the wireless connection request to the wireless communication apparatus even if an instruction is not given from a user after a wireless connection with the wireless communication apparatus is disconnected due to reception of the disconnection request from the wireless communication apparatus.

3. The wireless communication apparatus according to claim 2, wherein the operations further comprise:

when the wireless connection request is received from the first target apparatus in a state where the number of connections is less than the upper limit number, and the wireless connection request is received before the predetermined period elapses from the time when the first type apparatus is selected as the first target apparatus and the wireless connection with the first target apparatus is disconnected, re-establishing a wireless connection with the first target apparatus.

4. The wireless communication apparatus according to claim 1, wherein the selecting preferentially selects the first type apparatus as the first target apparatus over the second type apparatus.

5. The wireless communication apparatus according to claim 1, wherein the second type apparatus includes a support apparatus which is configured to support a predetermined command for prompting participation in the wireless network, and a non-support apparatus which is not configured to support the predetermined command, and wherein when the N1 apparatuses include the support apparatus and the non-support apparatus, the selecting preferentially selects the support apparatus as the first target apparatus over the non-support apparatus.

6. The wireless communication apparatus according to claim 5, wherein the operations further comprise:

when a state where the number of connections matches the upper limit number is transitioned to a state where the number of connections is less than the upper limit number after the support apparatus is selected as the first target apparatus and the wireless connection with the first specific apparatus is established, transmitting the predetermined command to the first target apparatus to re-establish a wireless connection with the first target apparatus.

7. The wireless communication apparatus according to claim 1, wherein the second type apparatus includes a support apparatus which is configured to support a predetermined command for prompting participation in the wireless network, and a non-support apparatus which is not configured to support the predetermined command, and wherein the operations further comprise:

in a state where the number of connections matches the upper limit number after the wireless connection with the first specific apparatus is established, receiving a second wireless connection request from a second specific apparatus;

when the second wireless connection request is received from the second specific apparatus, selecting a second target apparatus to be disconnected, from among N2 apparatuses which currently establish a wireless connection with the wireless communication apparatus (where N2 is an integer equal to or greater than 2);

transmitting a second disconnection request to the second target apparatus to disconnect a wireless connection with the second target apparatus;

establishing a wireless connection with the second specific apparatus after the wireless connection with the second target apparatus is disconnected; and when a state where the number of connections matches the upper limit number is transitioned to a state where the number of connections is less than the upper limit number after the first type apparatus is selected as the first target apparatus and the wireless connection with the first specific apparatus is established, and the support apparatus is selected as the second target apparatus and the wireless connection with the second specific apparatus is established, re-establishing a wireless connection with the second target apparatus which is the support apparatus preferentially over the first target apparatus which is the first type apparatus.

8. The wireless communication apparatus according to claim 1, wherein the second type apparatus includes a support apparatus which is configured to support a predetermined command for prompting participation in the wireless network, and a non-support apparatus which is not configured to support the predetermined command, and wherein the operations further comprise:

in a state where the number of connections matches the upper limit number after the wireless connection with the first specific apparatus is established, receiving a second wireless connection request from a second specific apparatus;

when the second wireless connection request is received from the second specific apparatus, selecting a second target apparatus to be disconnected, from among N2 apparatuses which currently establish a wireless connection with the wireless communication apparatus (where N2 is an integer equal to or greater than 2);

transmitting a second disconnection request to the second target apparatus to disconnect a wireless connection with the second target apparatus;

establishing a wireless connection with the second specific apparatus after the wireless connection with the second target apparatus is disconnected; and when a state where the number of connections matches the upper limit number is transitioned to a state where the number of connections is less than the upper limit number after the first type apparatus is selected as the first target apparatus and the wireless connection with the first specific apparatus is established, and the support apparatus is selected as the second target apparatus and the wireless connection with the second specific apparatus is established, re-establishing a wireless connection with the first target apparatus for which a wireless connection with the wireless communication apparatus is disconnected earlier between the first target apparatus and the second target apparatus, preferentially over the second target apparatus.

9. The wireless communication apparatus according to claim 1, wherein the specific wireless communication system has a mechanism in which, when a wireless connection is established between a pair of apparatuses to form a wireless network, the pair of apparatuses executes wireless communication for determining a base station and a client station of the wireless network.

10. The wireless communication apparatus according to claim 1, wherein the N1 apparatuses are apparatuses, in which an application for causing the wireless communication apparatus to execute an image processing function is not activated, among all apparatuses which currently establish a wireless connection with the wireless communication apparatus.

11. A non-transitory computer-readable medium having a computer program stored thereon and readable by a processor of a wireless communication apparatus, the computer program, when executed by the processor, causing the wireless communication apparatus to perform operations comprising:

in a state where a number of connections which is a number of wireless connections currently being established by the wireless communication apparatus operating as a base station of a wireless network matches an upper limit number, receiving a wireless connection request from a specific apparatus;

when the wireless connection request is received from the specific apparatus, selecting a target apparatus to be disconnected, from among N1 apparatuses which currently establish a wireless connection with the wireless communication apparatus (where N1 is an integer equal to or greater than two), wherein when the N1 apparatuses include a plurality of types of apparatuses including a first type apparatus which is inoperable connectable with the wireless communication apparatus and not supported with the wireless connection according to a specific wireless communication system, and a second type apparatus which is connectable with the wireless communication apparatus and supported with the wireless connection according to the specific wireless communication system, the selecting preferentially selects, based on a disconnection priority determined in advance for the plurality of types of apparatuses, an apparatus of a type having a highest disconnection priority as the target apparatus;

transmitting a disconnection request to the first target apparatus to disconnect a wireless connection with the target apparatus; and establishing a wireless connection with the specific apparatus after the wireless connection with the target apparatus is disconnected, wherein the first type apparatus has a function to automatically transmit a reconnection request to the wireless communication apparatus after being disconnected from the wireless communication apparatus by receiving the disconnection request from the wireless communication apparatus, and wherein the selecting preferentially selects the first type apparatus as the target apparatus over the second type apparatus.

12. The non-transitory computer-readable medium according to claim 11, wherein the specific wireless communication system is compliant with Wi-Fi Direct standard.

13. The wireless communication apparatus according to claim 1, wherein the specific wireless communication system is compliant with Wi-Fi Direct standard.

14. A wireless communication apparatus comprising:

a processor; and memory storing instructions that, when executed by the processor, cause the wireless communication apparatus to perform operations comprising:

in a state where a number of connections which is a number of wireless connections currently being established by the wireless communication apparatus operating as a base station of a wireless network matches an upper limit number, receiving a wireless connection request from a specific apparatus;

when the wireless connection request is received from the specific apparatus, selecting a target apparatus to be disconnected, from among N1 apparatuses which currently establish a wireless connection with the wireless communication apparatus (where N1 is an integer equal to or greater than two), wherein when the N1 apparatuses include a plurality of types of apparatuses including a first type apparatus which is connectable with the wireless communication apparatus and not supported with the wireless connection according to a specific wireless communication system, and a second type apparatus which is connectable with the wireless communication apparatus and supported with the wireless connection according to the specific wireless communication system, the selecting preferentially selects, based on a disconnection priority determined in advance for the plurality of types of apparatuses, an apparatus of a type having a highest disconnection priority as the target apparatus;

transmitting a disconnection request to the target apparatus to disconnect a wireless connection with the target apparatus; and establishing a wireless connection with the specific apparatus after the wireless connection with the target apparatus is disconnected, wherein the second type apparatus includes a support apparatus which is configured to support a predetermined command that is transmittable according to the specific wireless communication system for prompting participation in the wireless network, and a non-support apparatus which is not configured to support the predetermined command, and wherein when the N1 apparatuses include the support apparatus and the non-support apparatus, the selecting preferentially selects the support apparatus as the target apparatus over the non-support apparatus.

15. The wireless communication apparatus according to claim 14, wherein the specific wireless communication system is compliant with Wi-Fi Direct standard.

16. A non-transitory computer-readable medium having a computer program stored thereon and readable by a processor of a wireless communication apparatus, the computer program, when executed by the processor, causing the wireless communication apparatus to perform operations comprising:

in a state where a number of connections which is a number of wireless connections currently being established by the wireless communication apparatus operating as a base station of a wireless network matches an upper limit number, receiving a wireless connection request from a specific apparatus;

when the wireless connection request is received from the specific apparatus, selecting a target apparatus to be disconnected, from among N1 apparatuses which currently establish a wireless connection with the wireless communication apparatus (where N1 is an integer equal to or greater than two), wherein when the N1 apparatuses include a plurality of types of apparatuses including a first type apparatus which is connectable with the wireless communication apparatus and not supported with the wireless connection according to a specific wireless communication system, and a second type apparatus which is connectable with the wireless communication apparatus and supported with the wireless connection according to the specific wireless communication system, the selecting preferentially selects, based on a disconnection priority determined in advance for the plurality of types of apparatuses, an apparatus of a type having a highest disconnection priority as the target apparatus;

transmitting a disconnection request to the target apparatus to disconnect a wireless connection with the target apparatus; and establishing a wireless connection with the specific apparatus after the wireless connection with the target apparatus is disconnected, wherein the second type apparatus includes a support apparatus which is configured to support a predetermined command that is transmittable according to the specific wireless communication system for prompting participation in the wireless network, and a non-support apparatus which is not configured to support the predetermined command, and wherein when the N1 apparatuses include the support apparatus and the non-support apparatus, the selecting preferentially selects the support apparatus as the target apparatus over the non-support apparatus.

17. The non-transitory computer-readable medium according to claim 16, wherein the specific wireless communication system is compliant with Wi-Fi Direct standard.

* * * * *